United States Patent [19]

Vandivier, III

[11] Patent Number: 5,033,004

[45] Date of Patent: Jul. 16, 1991

[54] METHOD AND SYSTEM FOR BLENDING COAL AND OTHER NATURAL RESOURCES

[76] Inventor: John C. Vandivier, III, 1832 Cholla Ter., Indianapolis, Ind. 46240

[21] Appl. No.: 289,389

[22] Filed: Dec. 23, 1988

[51] Int. Cl.$^5$ .................... G05B 13/02; G06F 15/46
[52] U.S. Cl. .................... 364/468; 364/148; 364/173
[58] Field of Search .............. 364/502, 156, 173, 148, 364/152, 153, 172, 173, 468, 469; 222/145; 366/140, 141, 164

[56] References Cited

U.S. PATENT DOCUMENTS

| | | | |
|---|---|---|---|
| 4,538,221 | 8/1985 | Crain et al. | 364/502 |
| 4,701,838 | 10/1987 | Swinkels et al. | 364/164 |
| 4,786,182 | 11/1988 | Larsen | 364/502 |

Primary Examiner—Jerry Smith
Assistant Examiner—Paul Gordon

[57] ABSTRACT

A method and system for blending coal and other like natural resources in order to create optimized blended batches of coal. Coal blending optimization is provided for multiple time periods, multiple batches for more then one utility or other resource user, multiple preparation processing of portions or entire batches, multiple types of coal and multiple characteristics or parameters. Stability determination of the optimized blending ratios for the multiple cases described is provided to determine feasibility considering the inaccuracies of the actual mixing of initial bulk batches of coal. Efficient usage of computer memory and processing capabilities provides for simultaneous processing of the multiple cases within practical limits of time, computer processing power and computer memory.

60 Claims, 13 Drawing Sheets

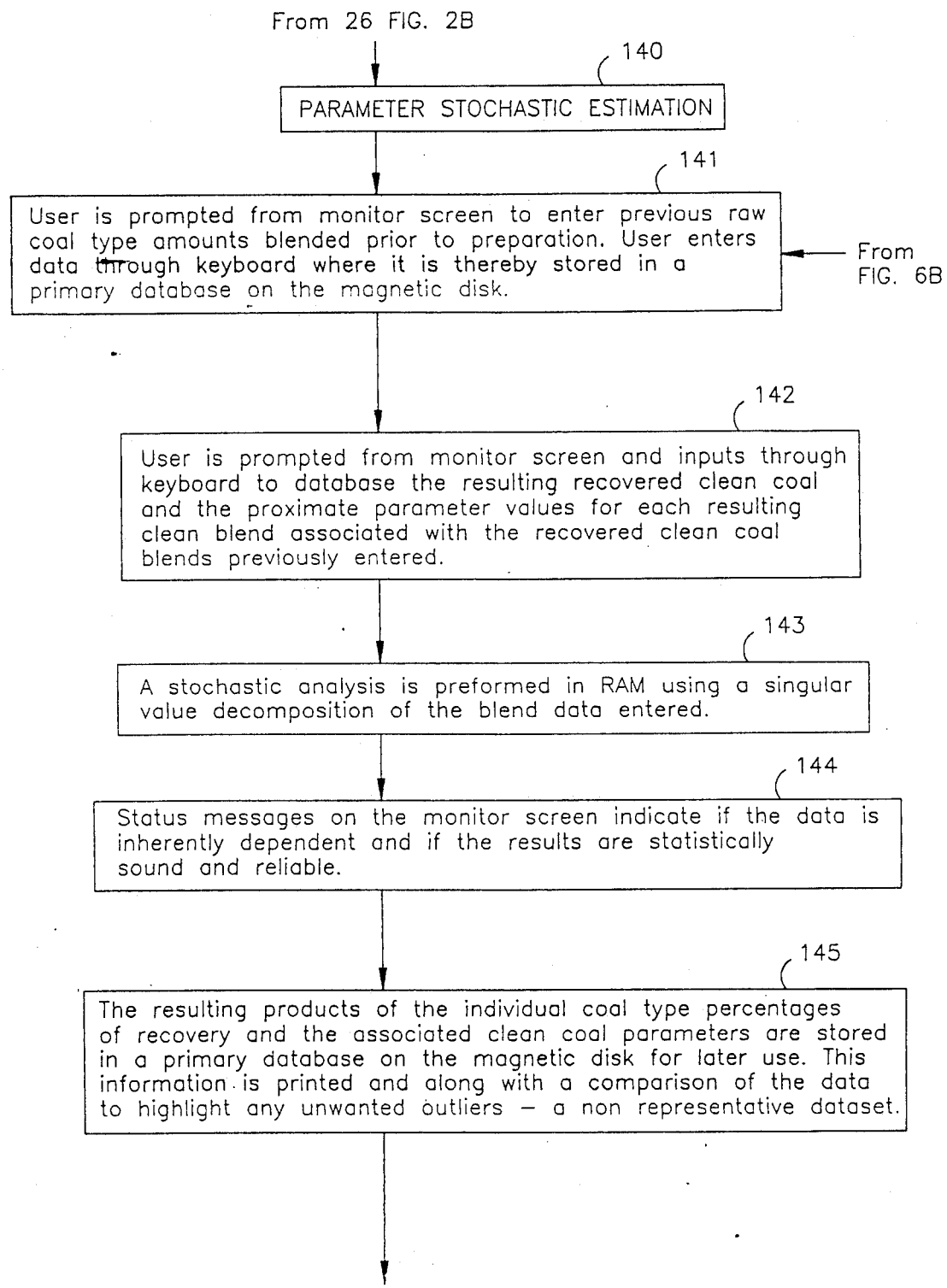

METHOD AND SYSTEM FOR BLENDING COAL AND OTHER NATURAL RESOURCES

BACKGROUND OF THE INVENTION

1. Field of the Invention

The field of this invention is the mining industry, particularly the bulk blending of natural resources such as coal to meet parameter requirements such as, among others, percentage of sulfur content.

2. Brief Description of the Prior Art

The field of application concerns many mining resources, but without loss of generality and to promote the understanding of the invention through a specific example, the coal mining industry shall be considered.

It is becoming increasingly difficult for a single seam of coal to be directly mined, shipped, and burned. As restrictions increase, efforts must be made to clean, treat, or modify the coal to meet certain parameter requirements. In the coal business, it is necessary to produce batches of coal that have particular percentages of, among others, sulfur, ash, moisture, and Btu/lb characteristics. These requirements are set and must be implemented by coal miners, coal preparation (wash) plants, coal brokers, and large users of coal such as utilities, factories, and others.

One method of obtaining a useable coal is to mix several coals together to form a blend. If appropriately mixed, the resulting blend may meet the requirements even if each separate coal does not.

However, it is difficult to determine the blend ratios that simultaneously satisfy all the requirements. The manual method used by most companies involves sampling the coals and making a guess at how to blend it. After sampling the resulting blend, another guess is made and so on.

Advances in this manual process were made in 1982 by Jasper Communications, of Jasper, Indiana. Jasper Communications made and sold a computer program called Perfect Blend. Perfect Blend was designed to find the minimum cost blend out of up to 250 stockpiles of coal. Perfect Blend considered 10 parameters for each coal type and the minimum and maximum requirement limit for each parameter. In finding the minimum cost blend it considered only the blends which simultaneously satisfy the parameter limits.

Further advances were made in The Coal Blending Solution program developed independently in 1987 by the present inventor. The Coal Blending Solution (hereinafter referred to as CBS) enables the user to minimize any parameter chosen. For example, the ability to maximize Btu/lb is important to those miners who are paid a premium for high Btu/lb coal. Others may wish to maximize percent sulfur in order to use their high sulfur coal, yet not exceed the required limit in the final shipment. And still others may wish to find a minimum cost blend in order to make a bid proposal that will meet parameter limits. The CBS does not limit the number of parameters or the choice of the parameters considered. It also provides a means of forcing part or all of a stockpile to be used.

The CBS also provides a means of determining the stability of an optimal blend. A blend is stable, if small changes in the blend ratios result in a blend that is still feasible (i.e. a blend that meets all the parameter requirements). Because of the inaccuracies in the actual mixing processes and the approximate nature of the parameter data used in determining a blend, it is important to determine a blend that is stable.

The CBS identifies the stability of an optimal blend. If it is insufficiently stable, the CBS provides a means of allowing the user to reoptimize to obtain a more stable result. And if no blend is possible within the parameter limits, the CBS determines this and can aid the user in identifying alternatives.

CBS and Perfect Blend can only determine a blend for one period such as one day for the requirements of only one batch of coal such as the batch for one power utility at a time. CBS and Perfect Blend cannot differentiate and optimize the blending for more than one batch for more than one power utility considered simultaneously. Consequently, the user cannot optimize its profits due to increased revenue over costs from several utilities. CBS and Perfect Blend can not distinguish between a blend that can be used raw and a blend sent to one or more preparation plants prior to blending. Furthermore, if multiple days and/or multiple batches for more than one power utility are simultaneously considered, memory limitations and increased processing time prevents or hinders a practical solution. Of course, no stability features are present for the multiple period (e.g. 31 days), multiple utility, and multiple preparation plant case since none of these features are themselves considered by either CBS or Perfect Blend. A need therefore arose for a system for optimal usage of multiple day and utility blending while minimizing the processing time and computer memory storage needed to practical levels.

SUMMARY OF THE INVENTION

The present invention relates to a process for blending natural resources such as coal over the following: multiple time periods considered simultaneously; multiple simultaneous orders—each with separate parameter requirement limits; multiple simultaneous preparation plants—each having an effect on the parameter aspects and percent recovery of a specific coal type; multiple coal types; and multiple parameters. There are no limits on the number of each multiple category mentioned other than hardware memory and processing time. Through the invention's usage of the computer and its memory, the present invention reduces the processing time and RAM memory requirements by an order of magnitude to a level at which multiple blending for the multiple day, utility and preparation plant cases can be optimized. For example, through its design, the present invention can handle a 31 day, 6 seam, 4 parameter blending solution from a 8088 processor on an IBM compatible with 640k RAM. Without the present invention, it would require over 4 Meg. of RAM and the processing times would increase greatly. Decisions to store the data in separate electronic databases appropriately organized practically eliminates permanent storage as a restriction for the maximum number of any category. The invention practically eliminates physical RAM memory as a physical restriction to the number of any category—since this makes array sizes available into the Gigabyte range. Hence, maximum flexibility is achieved with the multiple categories considered. Stockpile controls allow both minimums and maximums to be set on stockpiles of each coal type. Production controls allow both minimums and maximums to be set on the production amount of each coal type used on a specific period (e.g. day). These controls help mine managers control stockpiles as well as shipment quantities according to period to period (day to day) objectives. Moreover, a multiple time period, multiple order, multiple preparation plant, multiple coal type, and multiple parameter stability analysis is available to determine the stability of the resulting blends. This integrates with the optimization feature to enable an optimal solution that is sufficiently stable. Mine costs, transportation costs, preparation costs and revenues from the multiple order sources are all used. This allows the user to achieve a maximization of a meaningful profit relationship for the first time. However, costs can be minimized or any other parameter (e.g. percent sulfur, Btu/lb, etc.) can either be minimized or maximized. This also allows premiums paid and penalties charged for coal delivered to a particular contract within or out of parameter requirements to be weighed relative to other profit combinations. The result is a set of blends for each contract and for each time period that specifies the amounts of raw and/or clean coal to combine to meet the multiple parameter requirements optimally and stably.

Some of the objects and advantages of the present invention have been discussed above. Other objects and advantages of the present invention are discernable from the description of the preferred embodiment that follows.

DESCRIPTION OF THE PREFERRED EMBODIMENT

Figure 1:
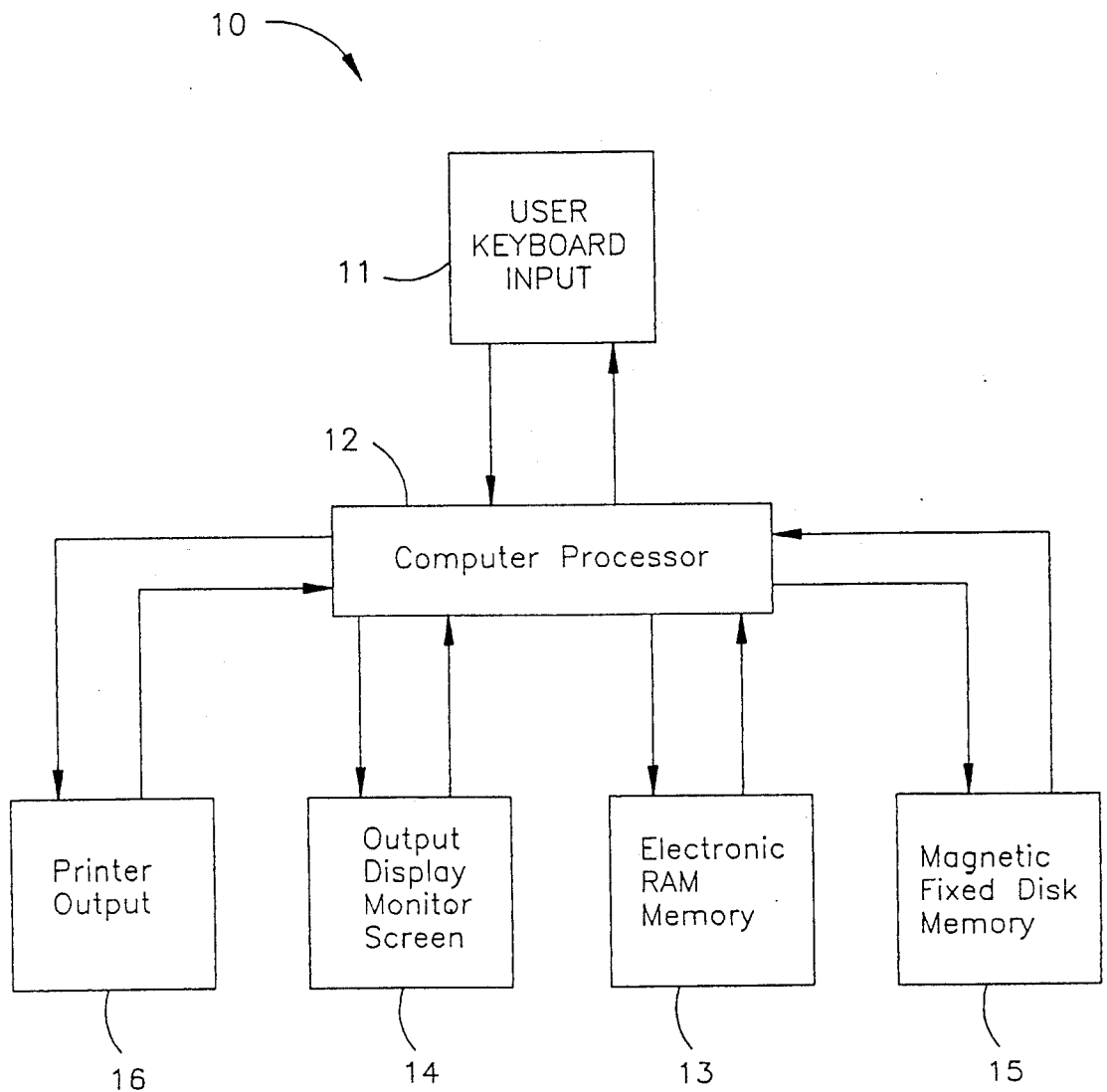
FIG. 1 is a block diagram schematically illustrating a computer and memory system used with the preferred embodiment of the present invention.

For purposes of promoting an understanding of the principles of the invention, reference will now be made to the embodiment illustrated in the drawings and specific language will be used to describe the same. It will nevertheless be understood that no limitation or loss of generally of the scope of the invention is thereby intended, such alterations and further modifications in the illustrated embodiment, and such further applications of the principals of the invention as illustrated therein being contemplated as would normally occur to one skilled in the art to which the invention relates.

The preferred embodiment of the present invention is for the blending of coal to obtain appropriate mixtures of coal in terms of various characteristics also referred to as parameters. Particularly, the preferred embodiment implements the blending of multiple coal types available to be processed in multiple available preparation plants and then shipped to multiple alternative utility buyers over multiple periods. Control of inventory and production levels are available for all periods. Multiple period stability is also available to produce blends of coal that are optimal and that comfortably meet the parameter requirements within the inaccuracies available in the actual bulk blending of the coal. Also, stockpile inventories are assumed to be built up prior to preparation plant processing, however, it is easily possible that stockpiles might wish to be controlled after the coal has been processed.

The preferred embodiment is useful to a coal mining company, a coal preparation plant, a coal broker, a coal loading stockyard, a coal burning utility, or any other company that needs to blend coal to meet parameter requirements. The preferred embodiment provides for controlling blends of coal on a daily basis with small stockpiles or for the blending of coal over many years—formulating combinations of reserves of coal that can be combined to meet parameter requirements (e.g. percent sulfur or Btu/lb) at a minimum cost or maximum profit. Also, other comparable blended natural resources that are processed, stored, and shipped and having analogous requirements to the bulk mixing of coal could make use of this invention.

The blending of coal through the use of the preferred embodiment of this invention can have major beneficial social and environmental consequences. By blending coal with the aid of this invention to determine the amount of low sulfur coal to purchase and mix with high sulfur coal, many companies can be able to meet increasingly stringent requirements at low enough costs to remain in business. By consistently meeting sulfur requirements on a daily, monthly, or yearly basis, utilities will be better able to control the sulfur pollution befouling our environment.

FIG. 1 illustrates the relationships between the computer processor 12 used to process the data input by the user through keyboard 11. The processor 12 is controlled by organized impulses from the RAM electronic memory 13 and stores electronically translated data into the RAM 13 or magnetic fixed disk 15. The current preferred embodiment of the present invention controls key processing of the processor outputs and outputs electronically formed data onto the output display screen 14 or printing a paper copy of output electronic data on the printer 16. The logic of the steps located as electronic charges in RAM electronic memory 13 guiding the processor 12 in its major actions and implementing the preferred embodiment of the present invention are listed as a flow chart in FIG. 2, FIG. 3, FIG. 4, FIG. 5, and FIG. 6.

Figure 2A:
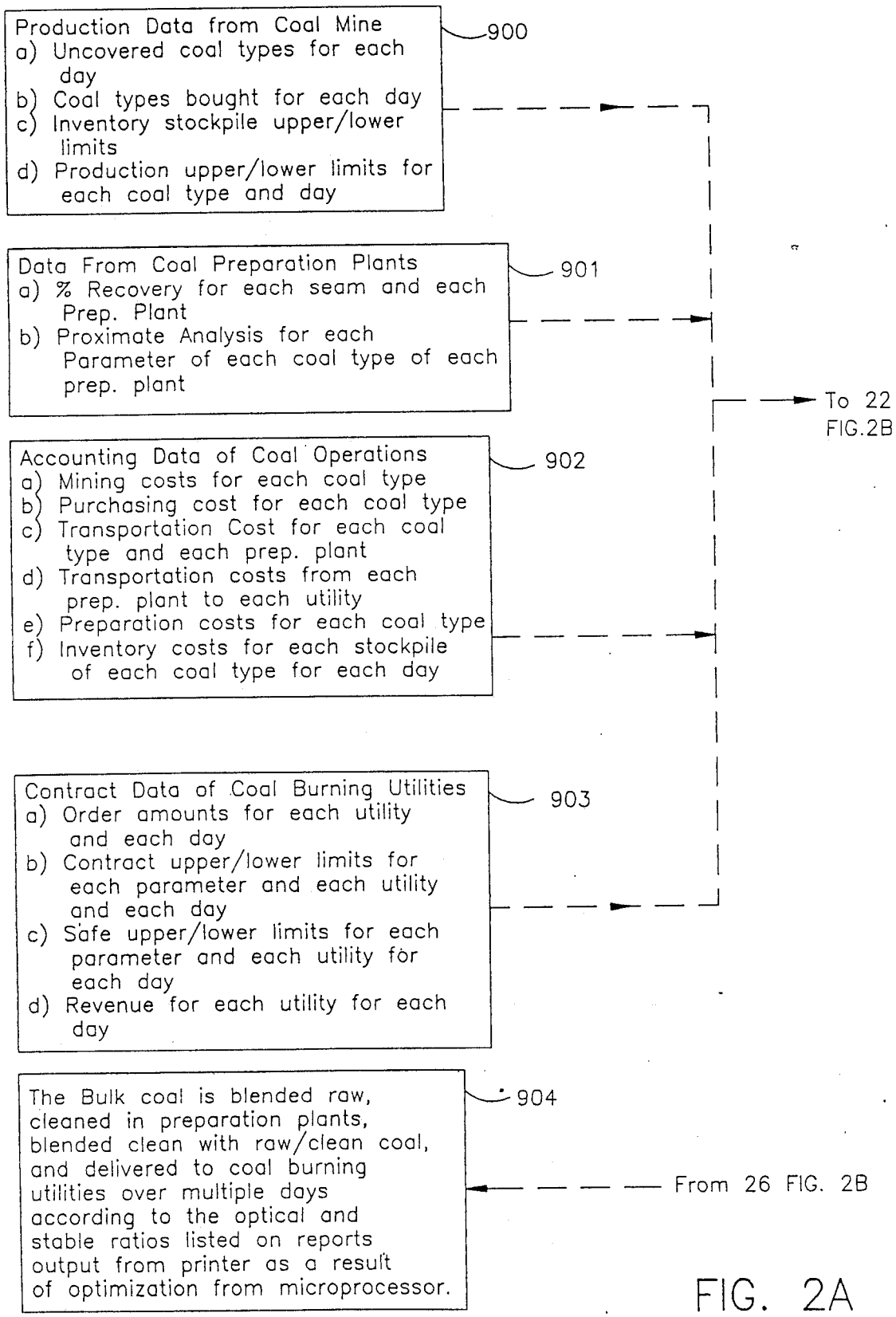
FIG. 2 is the initial portion of a flow chart of the method and process of achieving optimized coal blends provided for by the preferred embodiment of the present invention.
Figure 2B:
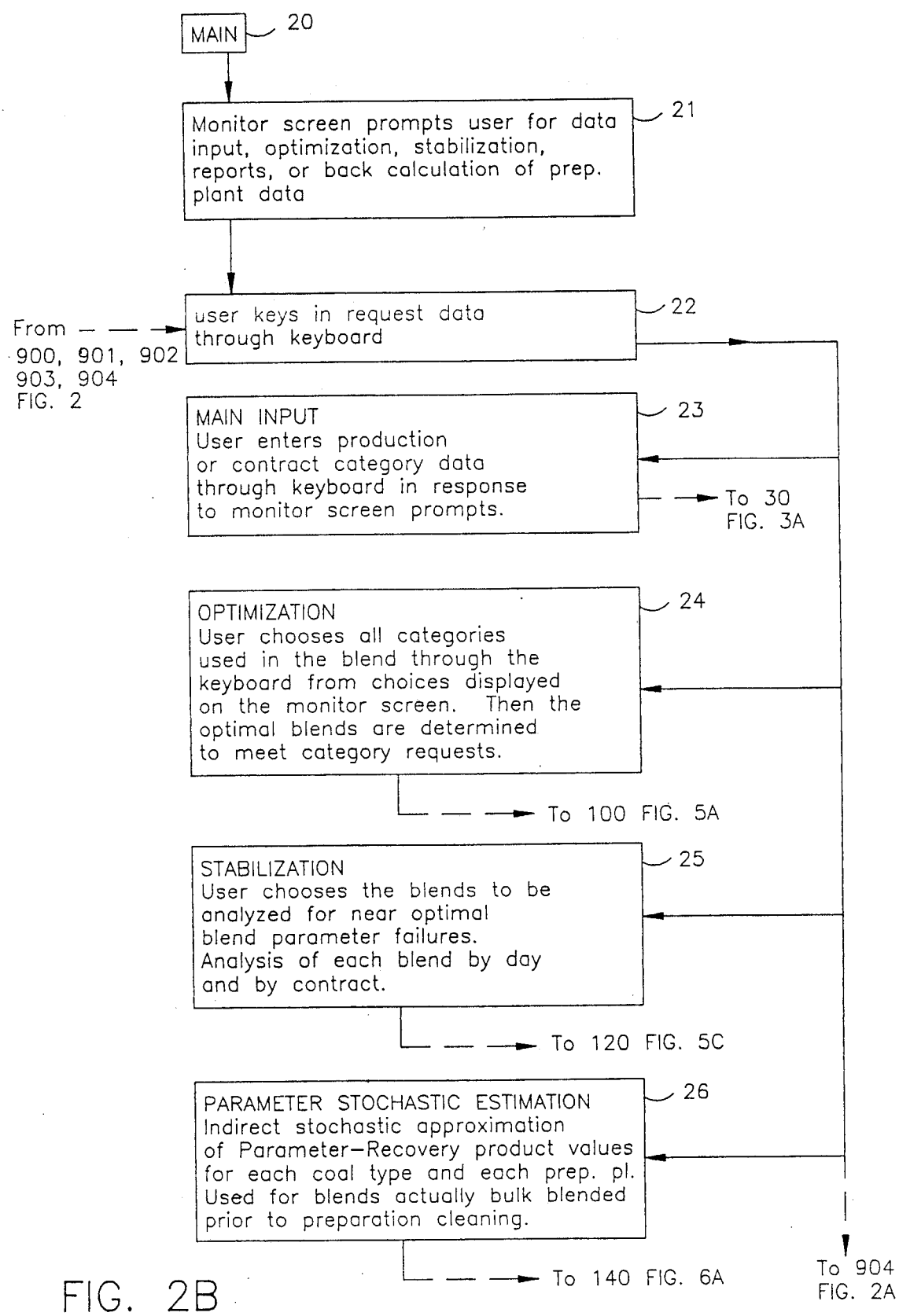

FIG. 2 illustrates the overall flow of the preferred embodiment of the present invention. Categories 900, 901, 902, and 903 list the input parameters from the outside mining, preparation, utility and accounting environments that need to be considered by the user to obtain an optimal stable set of blend batches of bulk coal delivered to each respective utility over each day contracted as shown in 904.

MAIN 20 represents the beginning of the preferred embodiment of the present invention as it becomes the tool to achieve the production, economic, and environmental objectives 904 from the data categories 900 thru 903. The user is continually prompted by the monitor screen 14 to enter input category data 21. The user responds to each screen prompt with a keyboard 11 input 22.

The user has four main objectives: keying the production or contract category information 23 that are stored in databases on the magnetic disk 15 through the preferred embodiment of the present invention; choosing the categories from those stored in the databases on magnetic disk 15 to determine the optimal blend ratios 24 through the RAM organized by the preferred embodiment of the present invention; analysing the near optimal blends for parameter failures by the microprocessor 12 that is controlled by the stability aspect 25 of the preferred embodiment of the present invention; and indirect stochastic estimation of current production parameter-recovery product quantities 26 by this aspect of the preferred embodiment of the present invention all of which are processed by the microprocessor 12 through the specific organization of the RAM 13 from data organized and stored in the magnetic memory disk 15 by the preferred embodiment of the present invention.

Figure 3A:
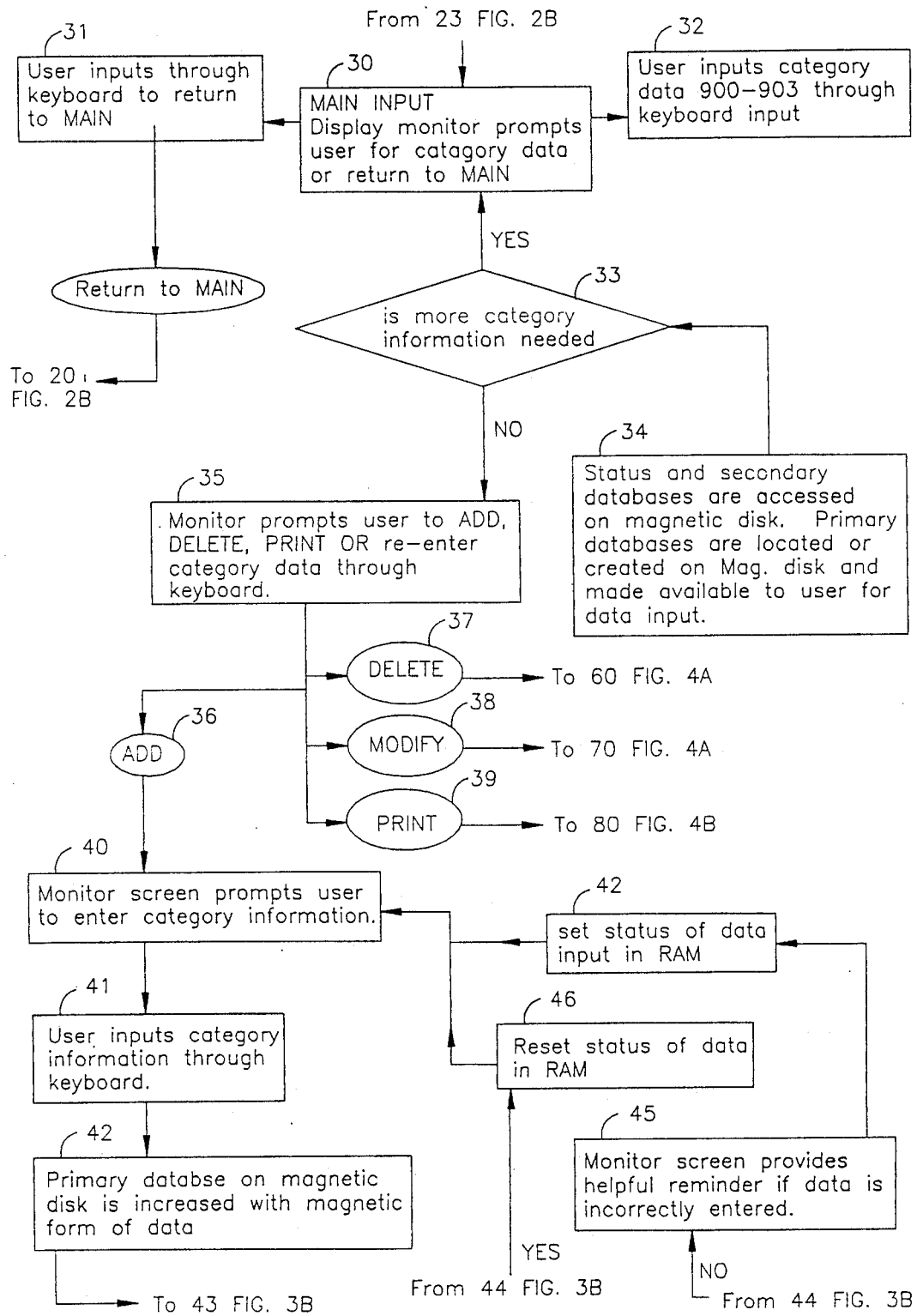
FIG. 3 is the second portion of a flow chart of the method and process of achieving optimized coal blends provided for by the preferred embodiment of the present invention.
Figure 3B:
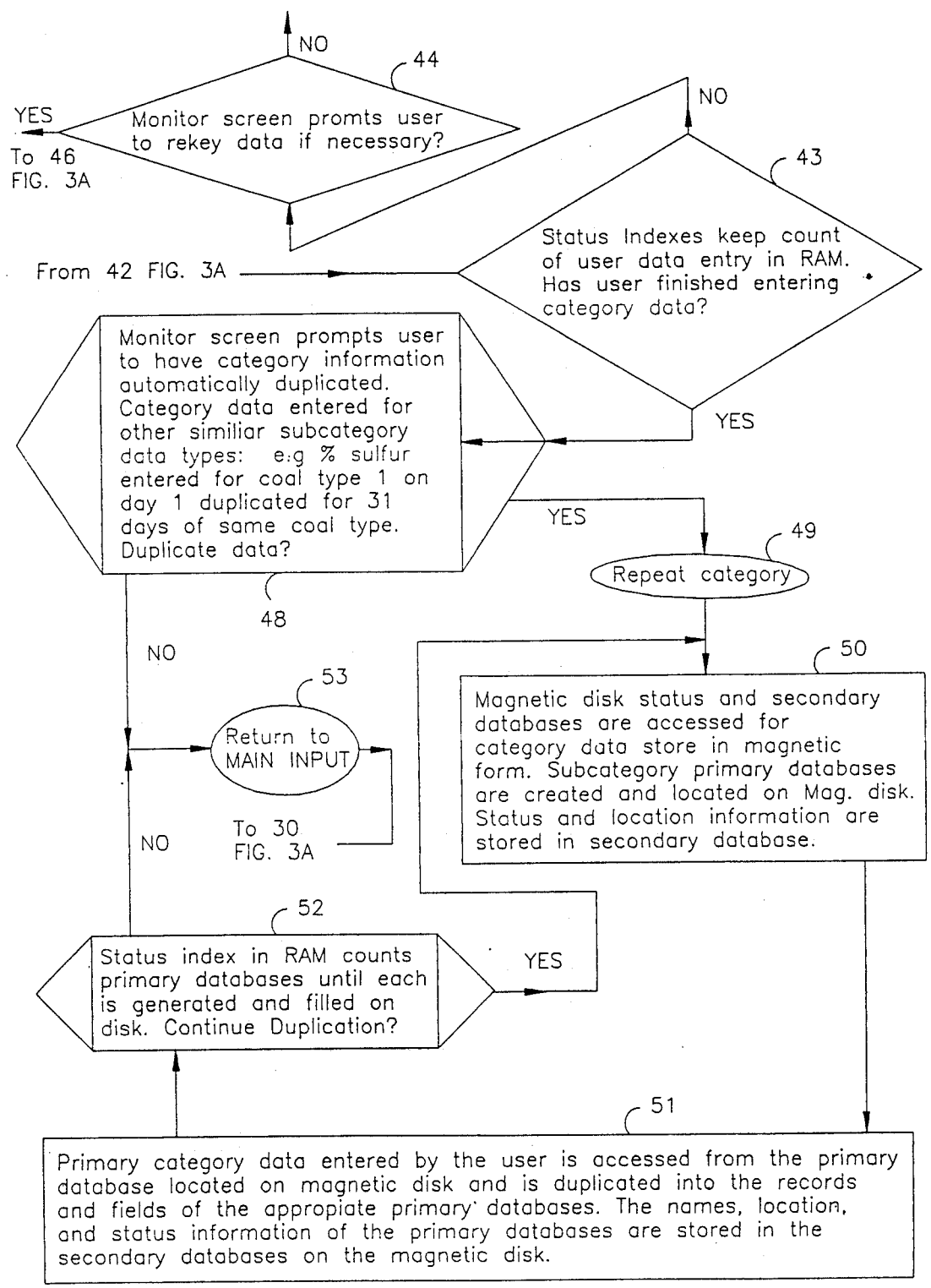

FIG. 3 shows more detail of the category data input process beginning at 30 with MAIN INPUT which is extended from 23 of FIG. 2. User is prompted 30 by monitor screen 14 to enter category data 32 or return to MAIN 31—which extends to 20 in FIG. 2. After user keys in category data 32 through keyboard 11, the electronic form of the data is organized and stored to primary secondary and status databases 34 on the magnetic fixed disk 15. The user is prompted for other category information 33 from the monitor display 14. User either specifies other category information to key in 30 and 32 or if the category database is correctly accessed the user can choose 35 through the keyboard to ADD 36, DELETE 37, MODIFY 38, PRINT 39 or reenter the same data if the process of entering the data is being chosen again. FIG. 3 shows the detail of a typical ADD sequence, but DELETE 37, MODIFY 38, and PRINT 39, are detailed in FIG. 4 at locations 60, 70, and 80, respectively.

To ADD 36 data, the user is prompted 40 by the monitor screen 14 to key in category data. Data is input 41 through the keyboard 11 and the electronic form of this data is stored on the magnetic disk 15 as a newly named primary database 42. Status indexes 43 count the category data entry and update the secondary and status databases on the magnetic fixed disk 15. The user is prompted from the monitor screen 14 to rekey data 44 if status count indicates data omissions. The user is again prompted 45 by the monitor screen 14 if any data is incorrectly entered and helpful reminders provide information at important prompts. If either 44 or 45 are required the status index counts are appropriately effected 46 and 47. Thus, it is the preferred embodiment of the present invention that the user is effectively guided through the input ADD 36 process requiring the user to input data answers through the keyboard 11 that they known well and not requiring the user to understand at any sophisticated level the inner workings of the complex organizational processes and electronically stored data preferences.

After a category or subcategory data type is entered through the keyboard 11 and stored to the primary database on the magnetic disk 15, the user has the option 48 to have this same data information duplicated for other similar subcategories to reduce excess keyboard 11 entry. If duplication is not opted or after duplication is completed, the user returns to the MAIN INPUT 30 to enter additional input through keyboard 11. If the user opts for duplication 49 the previously entered data is accessed from the primary database located on the magnetic disk 15, other similar primary databases are created 50, status and secondary databases are updated 50 and these primary databases are filled with the data accessed from the first primary database 51. Status registers in RAM 52 count the category indexes until all duplicated primary databases are filled with the initial data.

Figure 4A:
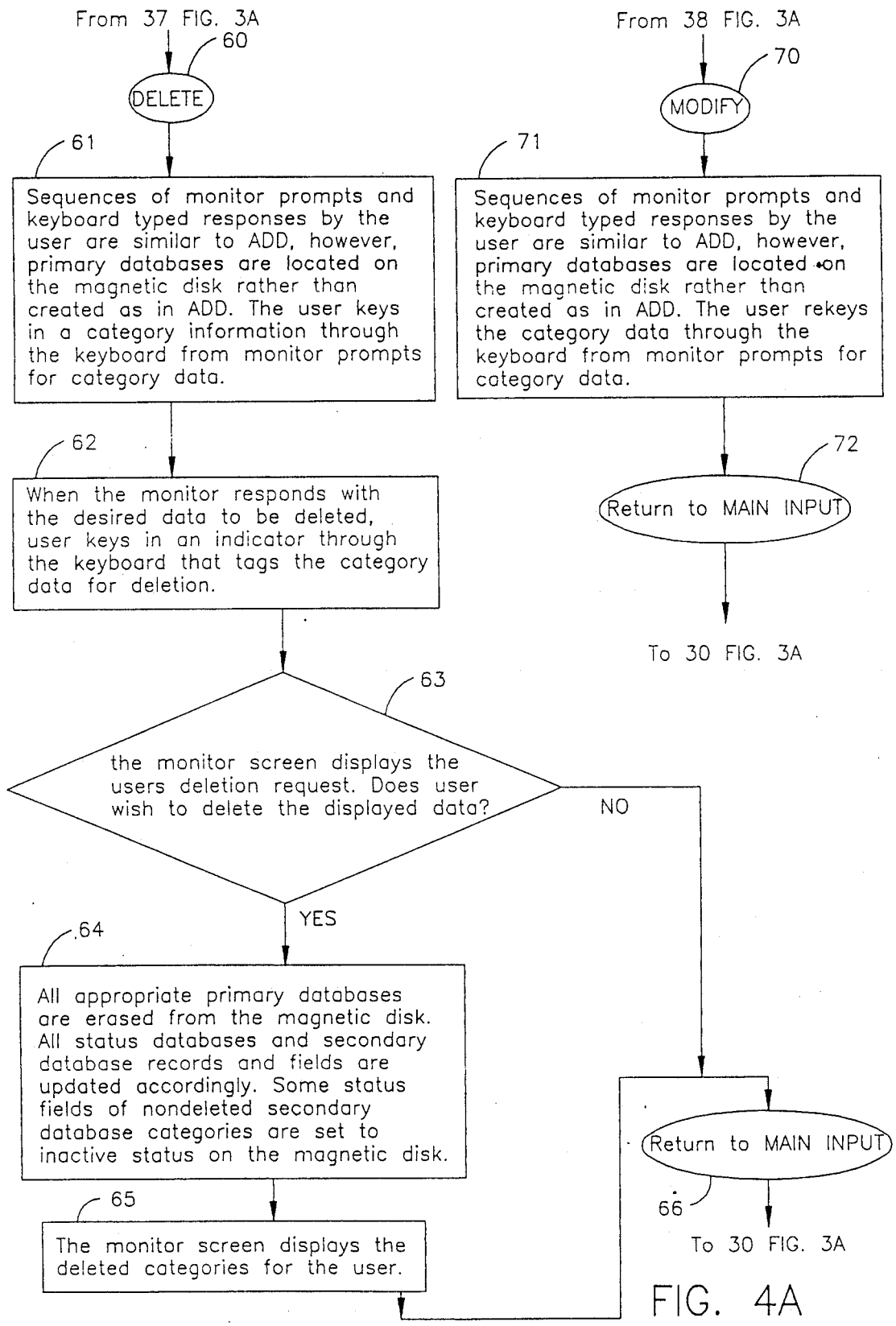
FIG. 4 is the third portion of a flow chart of the method and process of achieving optimized coal blends provided for by the preferred embodiment of the present invention.
Figure 4B:
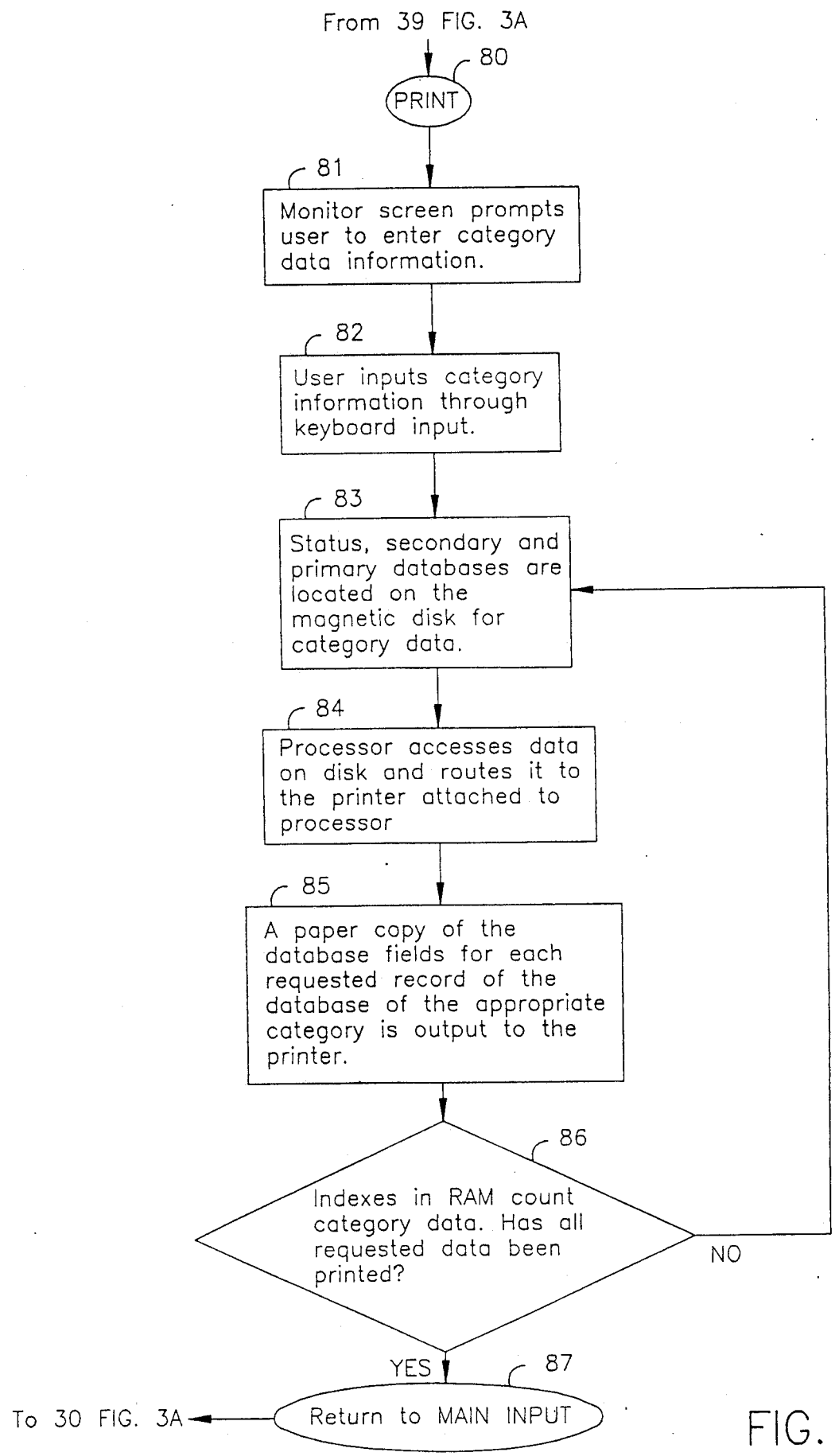
Figure 5A:
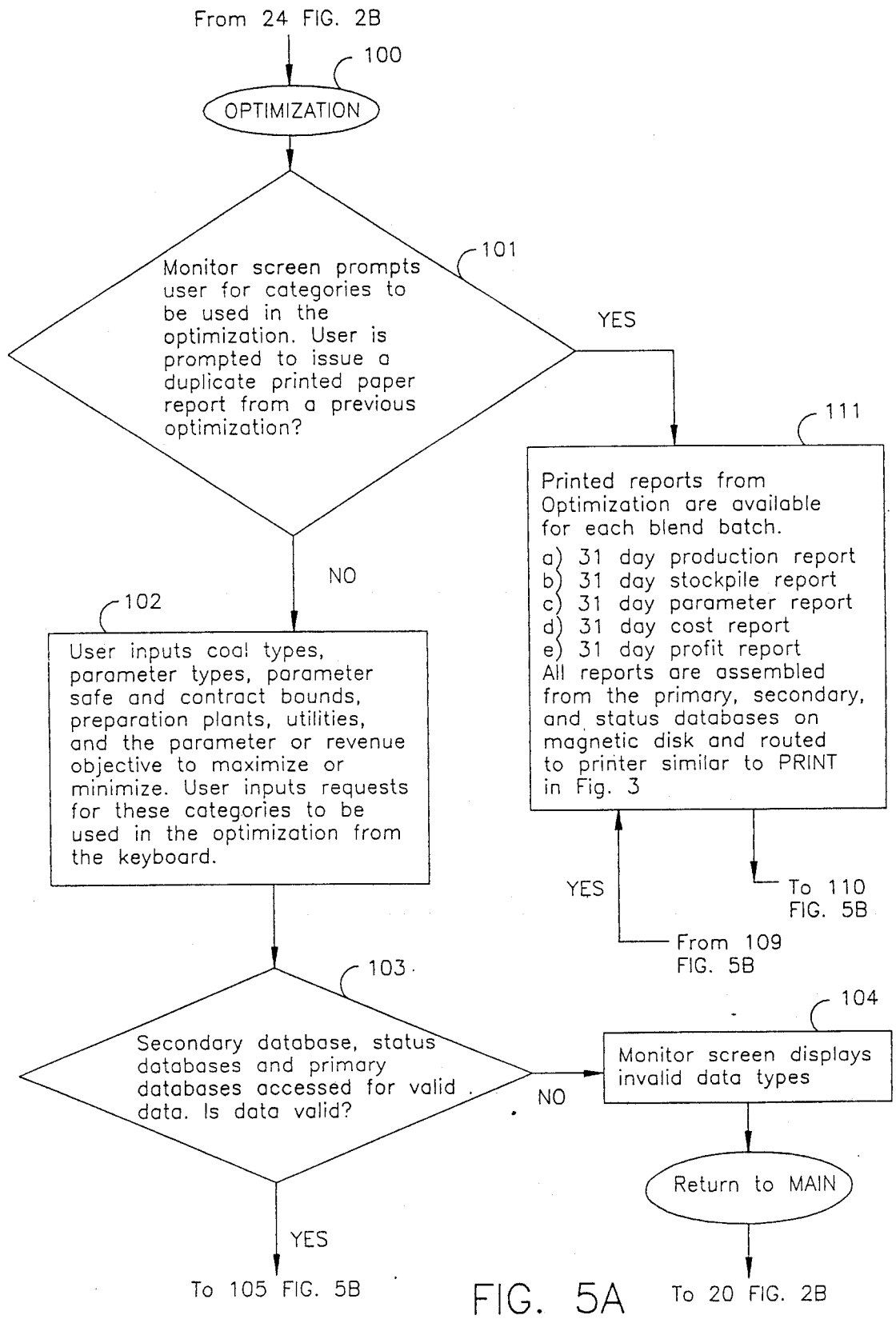
FIG. 5 is the fourth portion of a flow chart of the method and process of achieving optimized coal blends provided for by the preferred embodiment of the present invention.
Figure 5B:
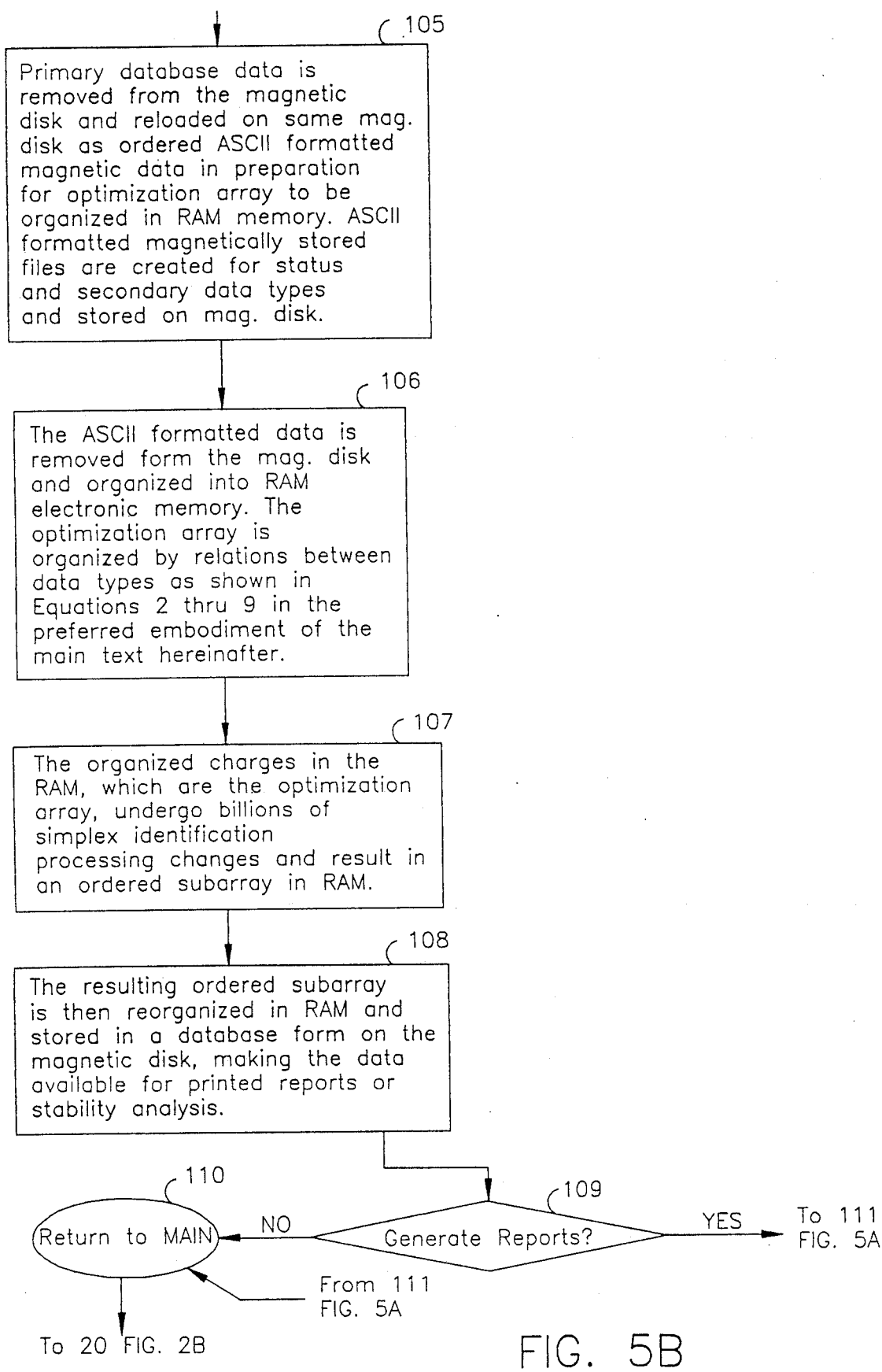
Figure 5C:
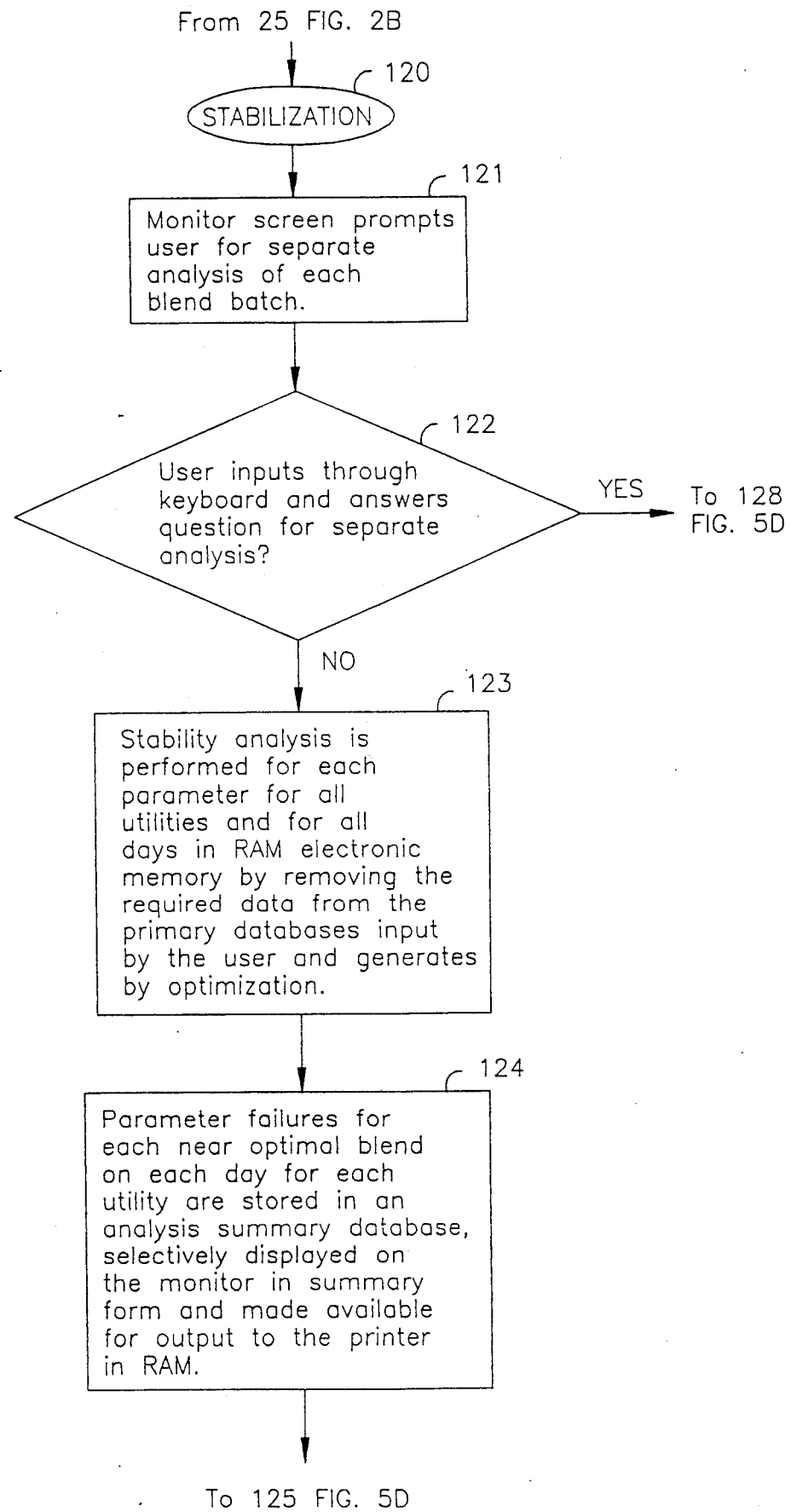
Figure 5D:
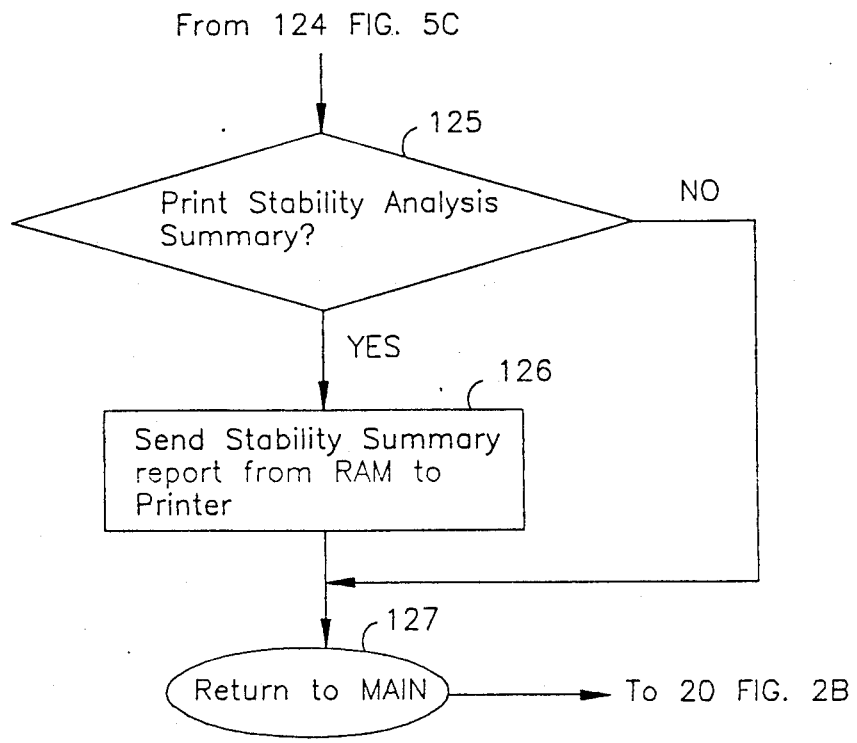
Figure 5D:
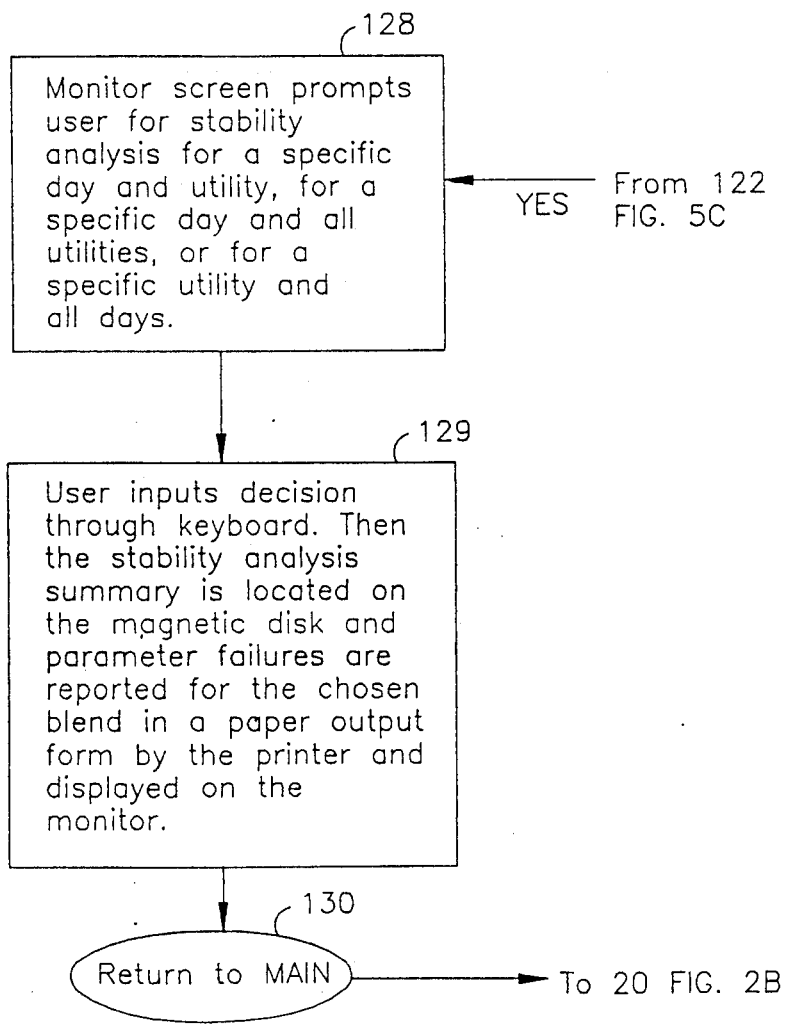

In FIG. 4, the data is deleted from DELETE 60, which is extended from DELETE 37 FIG. 3. Sequences of monitor 14 prompts and keyboard 11 inputs from the user are similar to ADD 36, however, primary databases are located 61 on the magnetic fixed disk 15 rather than created. When the monitor responds with the desired data category or subcategory to be deleted 62, the user keys in an indicator through the keyboard 11 to cause the status indicator to be set for deletion. The monitor screen 14 then displays the data that would be deleted for the user verification 63. If the user chooses to delete the category data 64 the primary databases are erased and the status and secondary databases are appropriately updated or set to inactive status. The monitor screen 14 then displays the data currently deleted 65 and returns the user to the MAIN INPUT display screen 30.

In FIG. 4, the data is modified from MODIFY 70 accessed from 38 in FIG. 3. The primary databases are located and not created on the magnetic disk 15, but the sequence 71 of screen prompts 14 and keyboard inputs 11 are much like those of the ADD sequence 36. After the category data is modified through keyboard 11 entries the user is returned to the MAIN INPUT display screen 30.

In FIG. 4, the PRINT 80 of database categories accessed from 39 in FIG. 3 and the user is prompted for the category database information to be printed 81. The user inputs 82 category information through the keyboard 11. The Status, secondary, and primary databases 83 are accessed on the magnetic disk 15 for category data. This electronic formatted data is routed 84 to the printer output 16 by the processor 12. A paper copy of the data is created 85 by the printer output. This process continues 86 until all the specified databases and records are printed. Then the user is returned to the MAIN INPUT 30 to continue data input or to continue with optimization 31.

In FIG. 5, the OPTIMIZATION 100 is accessed by the user from the MAIN 20 after the primary database entries have updated the category information accessible on magnetic disk 15. The user chooses 101 to input the categories to be used in an optimization from those stored on the magnetic memory 15 or the user chooses 101 to first print any duplicate reports 111 from a previous optimization. The user enters the desired categories 102 for optimization and chooses to the objective parameter and if it is to be maximized or minimized. Secondary and status databases are accessed for check on validity of chosen data categories 103. If any invalid data categories are chosen by the user, the monitor screen 14 displays a message 104 this invalid data type and the user is returned to MAIN 30. If all data types accessed are valid, then the primary, secondary, and status database data are removed from the magnetic disk memory 15 into RAM 13 where they are organized and returned 105 to the magnetic disk 15 as ASCII formatted files. These ASCII formatted files are then removed from the magnetic disk memory 15 into RAM memory 13 and specifically organized 106 by the relations between data types as shown in Equations 2 thru 9 in the preferred embodiment of the present invention hereinafter disclosed. The organized charges in RAM 13, which are the optimization array can undergo billions of simplex identification and modification processing changes 107 and the result is an ordered subarray in RAM 13. The resulting ordered array is reorganized in RAM and stored in a database form on the magnetic disk 108 making the data available to be printed 111 in several report types if the user chooses to Print reports 109. Otherwise, the user can choose through the keyboard 11 to return to MAIN 110 to access stabilization 25.

The STABILIZATION 120 in FIG. 5 is accessed from 25 in FIG. 2 from MAIN 20. The user is prompted 121 from the monitor screen 14 to key in stabilize blends separately 122 through the keyboard 11. If the user chooses to analyze the stability of all the blend batches, then each batch is removed from the primary databases for stability analysis 123. Parameter failures 124 analyzed by electronic processes within RAM 13 for each near optimal blend on each day for each utility are stored in an analysis summary database on magnetic disk 15 for summary reporting 125. The preferred embodiment of this stability analysis is hereinafter described in detail. If the user chooses to print summary analysis 125, then the summary is printed on a paper report 126 by the printer 16 and the user can return to MAIN 127.

If the user chooses to analyze each blend batch separately, the display monitor 14 prompts the user for the specific batch 128, and the user enters batch from the keyboard 11 and the preferred embodiment of the stability analysis is performed 129 electronically by the processor 12 and made available to the user in a printed report form. The user can then return to MAIN 130.

The results of the stability analysis show how many near optimal blends would fail within the accuracy of the actual bulk coal mixing process. If these failures are not acceptable to the user, the user can reoptimize 24 with tighter contract limits 102 designated as safe limits by keying in these changes through the keyboard 11 and processing the resulting optimization array of electronic charges with the preferred embodiment of the present invention. The user continues this process of optimization 24 and stabilization 25 until the user is satisfied with the balance. The user then blends the bulk coal 904 in the ratios specified by the optimization report 111 being fully aware of the stability of the bulk blend of coal within the accuracy of the bulk blending process from the stabilization report 126.

Figure 6B:
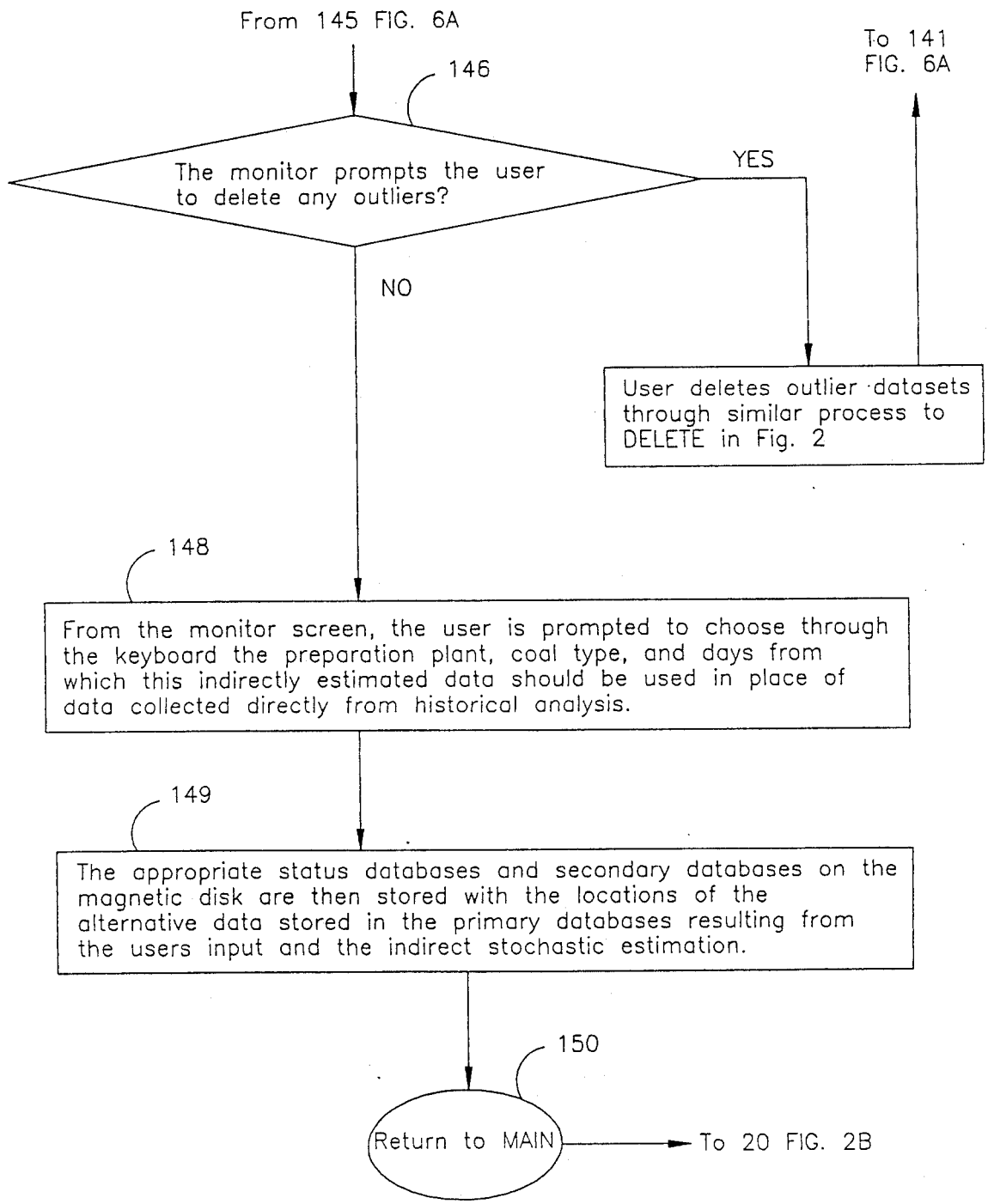
FIG. 6 is the fifth portion of a flow chart of the method and process of achieving optimized coal blends provided for by the preferred embodiment of the present invention.

If the user is blending the bulk coal prior to the preparation cleaning process, the user can indirectly determine an estimate of the product of the clean coal type recovery percentage and the respective proximate parameters by the PARAMETER STOCHASTIC ESTIMATION process 26 in FIG. 2 extended to 140 FIG. 6. The user is prompted from the monitor screen 14 to enter previously bulk blended raw coal ratios of several batches of coal of the same coal types 141. The user is prompted from the monitor screen 14 to input through the keyboard 11 and store to the magnetic disk 15 the batch blended recovered amounts from each of these previously produced batches 142 as well as the proximate clean coal lab analysis of the produced blended batches.

It is the preferred embodiment of the present invention to organize a singular value decomposition of the data 143 in the processor through the preferred embodiment of the process as described hereinafter. Status messages indicate if the data is reliable 144 and the resulting processed products of the individual coal type percentages of recovery and the associated clean coal parameters are stored in a primary database on the magnetic disk for later use 145. This information along with a comparison of the data to highlight any nonrepresentative data sets are printed on the printer 16. The user is prompted by the monitor 14 to delete any outliers 146. The user deletes any outlier datasets 147 through the keyboard 11 and a deletion process similar to DELETE 37. From the monitor screen 14, the user is prompted to choose through the keyboard 11 that the indirectly estimated data be used in any optimization process, instead of any historical directly determined data 148. The appropriate status and secondary databases are adjusted on the magnetic disk 15 and the locations and names of the alternative databases are stored on the magnetic disk 15 along with the data products to be used in optimization 149. The user can then return to MAIN 20 to reoptimize through 24.

The following example is used to illustrate the preferred embodiments of the invention and will be from a coal miner's point of view. This specific example is not intended to limit the invention, but to make it more easily understood.

Before several coal types are mixed and shipped, the blended amounts of each coal must be determined. Blending of coal is essentially accomplished by the bulk mixing of tons of coal is different types to obtain a "blend" or batch of coal that needs to have certain characteristics of parameters. For instance, suppose that there are initially 6 seams of coal available in the quantities shown in Table 1:

TABLE 1

| Beginning Tons Available in Each Stockpile | |
|---|---|
| COAL TYPE | AVAILABLE TONS |
| 1 | 50000 |
| 2 | 1900 |
| 3 | 13000 |
| 4 | 30000 |
| 5 | 2000 |
| 6 | 15000 |

Each coal type can be mixed raw (as mined) or it can be first cleaned by a preparation plant process and then mixed with other clean or raw coal. Proximate analysis of each raw coal type might reveal that the percent sulfur, ash, moisture and Btu/lb are as shown in Table 2:

TABLE 2

| | Proximate Analysis for Raw Coal | | | |
|---|---|---|---|---|
| COAL TYPE | PERCENT SULFUR | PERCENT ASH | PERCENT MOISTURE | BTU/LB |
| 1 | 3.70 | 10.00 | 10.50 | 11200 |
| 2 | 4.00 | 13.50 | 11.00 | 11000 |
| 3 | 5.00 | 9.50 | 10.00 | 11150 |
| 4 | 4.30 | 11.00 | 9.50 | 10900 |
| 5 | 4.10 | 9.00 | 9.00 | 11000 |
| 6 | 1.00 | 11.50 | 10.50 | 10000 |

After cleaning, the chemical parameters of the coal will change (e.g. the sulfur and ash content will be reduced).

Table 3 shows the effect that a preparation process might have on the proximate values of each coal type:

TABLE 3

| | Proximate Analysis for Clean Coal | | | |
|---|---|---|---|---|
| COAL TYPE | PERCENT SULFUR | PERCENT ASH | PERCENT MOISTURE | BTU/LB |
| 1 | 2.96 | 8.00 | 8.40 | 11210 |
| 2 | 3.20 | 10.80 | 8.80 | 11020 |
| 3 | 4.00 | 7.60 | 8.00 | 11175 |
| 4 | 3.44 | 8.80 | 7.60 | 10980 |
| 5 | 3.28 | 7.20 | 7.20 | 11030 |
| 6 | 0.80 | 9.20 | 8.40 | 10100 |

The Preparation process also reduces the amount of coal since only the useable part of the raw coal is recovered. Table 4 illustrates typical percent recovery quantities of each coal type;

TABLE 4

| Process Recovery Percents | |
|---|---|
| PROCESS NUMBER | PERCENT RECOVERY |
| 1 | 100.0 |
| 2 | 78.0 |
| 3 | 80.0 |
| 4 | 74.0 |
| 5 | 90.0 |
| 6 | 87.0 |

An unlimited combination of blends can be produced from the original 6 coal types by mixing both raw and clean coals. However, there are restrictions which limit the blends that are acceptable.

Assume that batches or blends must be prepared for different utility contracts. Each utility contract requires that the delivered coal have percent sulfur, percent moisture, percent ash, and a heat content (in Btu/lb) within specified upper and lower limits. These upper and lower limits may vary for each contract as Table 5 illustrates:

TABLE 5

| | Proximate Limits for Ordered Coal | | | | | | | |
|---|---|---|---|---|---|---|---|---|
| UTILITY NUMBER | SULFUR LIMIT | | ASH LIMIT | | MOISTURE LIMIT | | BTU/LB LIMIT | |
| | Upper | Lower | Upper | Lower | Upper | Lower | Upper | Lower |
| 1 | 4.0 | 0.0 | 10.5 | 0.0 | 12.5 | 0.0 | 11500 | 11000 |
| 2 | 4.2 | 0.0 | 10.0 | 2.0 | 11.5 | 0.0 | 11500 | 10900 |

A blend of coal from the combinations of raw and/or clean coal is sought to meet these specifications.

Moreover the problem is greatly compounded since these specifications must be met for varying quantity orders from each utility for not just one day, but for each day of a 31 day month. Table 6 illustrates orders placed by each of 2 utilities over a 31 day month:

TABLE 6

| | Utility Daily Orders | |
|---|---|---|
| DAY NUMBER | UTILITY NUMBER 1 | UTILITY NUMBER 2 |
| 1 | | 5000 |
| 2 | | 5000 |
| 3 | | 5000 |
| 4 | | |
| 5 | | |
| 6 | | |
| 7 | 10000 | |
| 8 | 10000 | |
| 9 | | 5000 |
| 10 | | 5000 |
| 11 | | |
| 12 | | |
| 13 | | |
| 14 | 10000 | |
| 15 | 10000 | |
| 16 | | 5000 |
| 17 | | 5000 |
| 18 | | |
| 19 | | |
| 20 | | |
| 21 | 10000 | |
| 22 | | 5000 |
| 23 | | 5000 |
| 24 | | |
| 25 | | |
| 26 | | |
| 27 | | |
| 28 | 10000 | |
| 29 | | 5000 |
| 30 | | 5000 |
| 31 | | |

There is an initial stockpile of each coal type as was illustrated in Table 1, but each day thereafter, coal may be uncovered from each coal type and made available for blending. The amounts of daily uncovered coal are projected for a 31 day month and an illustration of this follows in Table 7:

TABLE 7

| | Projected Tons Uncovered For This Month | | | | | |
|---|---|---|---|---|---|---|
| DAY NUMBER | COAL TYPE 1 | COAL TYPE 2 | COAL TYPE 3 | COAL TYPE 4 | COAL TYPE 5 | COAL TYPE 6 |
| 1 | | | 1100 | 2400 | 1100 | |
| 2 | | | 1100 | 2400 | 1100 | |
| 3 | | | 1100 | 2400 | 1100 | |
| 4 | | | 1100 | 2400 | 1100 | |
| 5 | | | 1100 | 2400 | 1100 | |
| 6 | | | | | | |
| 7 | | | | | 1100 | |
| 8 | | | | | 1100 | |
| 9 | | | | | 1100 | |
| 10 | 2800 | 2500 | | | | |
| 11 | 2800 | | | | | |
| 12 | 2800 | 1200 | | | | |
| 13 | 2800 | | | | | |
| 14 | 2800 | 1200 | | | | |
| 15 | 2800 | 1200 | | | | |
| 16 | 2800 | 1200 | | | | |
| 17 | 2800 | 1200 | | | | |
| 18 | 2800 | 1200 | | | | |
| 19 | 2800 | 1200 | | | | |
| 20 | 2800 | | | | | |
| 21 | 2800 | 1200 | | | | |
| 22 | 2800 | 1200 | | | | |
| 23 | 2800 | 1200 | | | | |
| 24 | 2800 | | | | | |
| 25 | 2800 | | | | | |
| 26 | 2800 | | | | | |
| 27 | 2800 | | | | | |
| 28 | 2800 | 1200 | | | | |

TABLE 7-continued

| | Projected Tons Uncovered For This Month | | | | | |
|---|---|---|---|---|---|---|
| DAY NUMBER | COAL TYPE 1 | COAL TYPE 2 | COAL TYPE 3 | COAL TYPE 4 | COAL TYPE 5 | COAL TYPE 6 |
| 29 | 2800 | 1200 | | | | |
| 30 | 2800 | 1200 | | | | |
| 31 | | | | | | |

In many instances it is necessary to limit the amount of a particular coal type used in a blend on a particular day within a minimum and/or maximum amount. Similarly, it may be useful to limit the stockpiles of a particular coal type on a particular day within a minimum and/or maximum amount.

For a coal mining company to operate effectively, it is not enough to just meet the requirements outlined above, but it is also necessary for them to make a profit. All costs are available: the mining costs per ton of each coal type, the costs of transporting each coal type from the mine to the each utility, the costs of transporting each coal type from the mine to each preparation plant, the transportation costs from each preparation plant to each utility, and the preparation plant costs to process each coal type. The revenues that the utility is paying (or may pay) per ton is available. Hence, the profit can be determined for the many possible blends that meet all of the requirements outlined above.

The coal company may wish to determine a set of blends for each day and for each utility to maximize their profits, or minimize their costs, or to minimize or maximize some other parameter (e.g. Btu/lb where premiums are paid based on a high Btu/lb value over a 31 day period).

The coal company also wants to meet these orders with stable blends. A stable blend assures that contract requirements are met if coal is not combined in the field in the exact ratios specified or if the quantities determined from the proximate analysis are slightly inaccurate. Stable blending is difficult since the actual mixing of coal involves the mixing of tons of material. Consequently, the mixing process is not very precise. Therefore, optimum blending ratios can often not be met if they require too much precision. Stability is achieved by using optimum blending ratios which allow for the inaccuracy in the blending process. Since these practical problems are common, stable blends are important to achieve.

The preferred embodiment of the present invention achieves all of the objectives specified above for this specific example and more for analogous examples. The preferred embodiment of the present invention employs a computer to determine optimal blending ratios for the blending process. FIG. 1 illustrates the components of the computer 10 used. To employ the preferred embodiment of the present invention, the user types in the data listed in the tables above on an electronic input keyboard 11 when prompted by questions and data screen forms displayed on an output display monitor screen 14. These readable questions and forms are etched and formed by a electron beam on the monitor screen 14 guided by the microprocessor 12 which is being controlled by a sequence of digital impulses that are located in the electronic memory 13 in the form of computer software.

Monitor screen 14 displays entry screens typified by those illustrated in Table 8 and Table 9. By typing in preparation plant data on keyboard 11 the microprocessor 12 stores an electronic digital translation of this data into the electronic Random Access Memory (RAM) 13. The monitor screen 14 then displays a readable form of the stored electronic data that appears as illustrated in Table 8. By repeated entries of the preparation plant code and name, the RAM memory 13 is increasingly filled with an electronic translation of the data. After all the plant data have been entered through keyboard 11 (plant number 1 being reserved for the raw data) or 10 entries have been entered, whichever is the lesser, the screen monitor will prompt the user to Continue to add data, Save the data to the magnetic fixed disk memory 15, Reenter the data if a data entry mistake has been made, or Print the contents of the plant database through printer output 16 as it is stored in its magnetic form on the fixed disk 15.

TABLE 8

PREPARATION PLANT DATA
Selection Status M

| PLANT NUMBER | PLANT CODE | PLANT NAME |
|---|---|---|
| 1 | RAW | Raw Coal as is - NO PREPARATION |
| 2 | CARB | Carbondale Preparation Plant |
| 3 | XXX | XXX Preparation Plant |

Exit(E), Save(S), Continue(C), Reenter(R), or Print(P) data? R
Save any changes before pressing Continue.

TABLE 9

| Repeat Status Y | PARAMETER TYPE: | Selection Status A |
|---|---|---|
| | % SULFUR | |
| | NUMBER CODE | |
| PLANT: | 1 RAW | |
| DAY: | 1 of 31 | |

| COAL NUMBER | COAL CODE | % SULFUR QUANTITY |
|---|---|---|
| 1 | 1ETOP | 3.70 |
| 2 | 1EBOT | 4.00 |
| 3 | 1WTOP | 5.00 |
| 4 | 1WBOT | 4.30 |
| 5 | 1WSUMP | 4.10 |
| 6 | AAA | 1.00 |

Exit(E), Save(S), Continue(C), Reenter(R), or Print(P) data? R
Save any changes before pressing Continue.

The preferred embodiment of the invention is to separate each data type into separate files stored on the magnetic fixed disk 15 as contiguous sequences of the same data type stored as a sequence of magnetic fluxes. In the "minds eye", one can think of these separate files as columns of data on a piece of paper. It is intended to have as few columns as possible on a sheet of paper and as many sheets of paper as you need to hold all of the primary information. Then use other sheets of paper with columns that contain the organizational information locating the other sheets of paper that hold the primary data. This is all done electronically and magnetically by the preferred embodiment of the present invention. The "sheets of paper" are called database files. Each piece of data is stored in a record which can be thought of as a "row" on the sheet of paper. If more than one data type needs to be stored in a database, then a "column" or field must be added in the database. Hence, only those fields which are absolutely necessary to address the data type are included in the database.

Records and fields, however, are actually information stored as magnetic flux and since the number of database fields are electronically limited—approximately a few hundred, but the number of records are relatively unlimited—a few billion or more, the sequence of electronic instructions structures the databases to limit the number of fields required. Each data type is assigned to its own database and instead of using extra fields, extra databases are generated as necessary. To organize these primary databases, secondary databases are used which contain the names of the primary databases and their associated data types. Thus their is a pyramid structure of databases and this data structures does not limit the number of coal types, the number of preparation plants, the number of utilities or the number of periods that can be stored in their magnetic form on a fixed disk 15.

Table 9 shows a typical form of the preferred embodiment of the present invention on a monitor screen 14, electronically promoting the user to type in the plant number, day number, and proximate percent sulfur values associated with the raw coal of each of the 6 coal types. The user has typed in Y (yes) to the repeat status prompt on an earlier screen which will cause the other 30 day percent sulfur values for each raw coal type (i.e. plant number 1) to have the same sulfur values as day 1. This prevents unnecessary data entry. When the S is typed to save this percent sulfur parameter, a new database is formed in the memory 15 with fields for percent sulfur, plant number, and day number. This primary database is given a name and that is saved in a field in a secondary database. The name of the parameter type (i.e. % SULFUR) is stored in an adjacent field of the same record of this secondary database. Table 9 lists some of the key data types (array variables) and associated address data types (index variables):

TABLE 10

Key Array and Index Variables
(key data types and index data types)

PAR(t,p,s,par#) - parameter array (i.e. % sulfur, Btu/lb, . . . etc.)
PARL(t,c,lim_type,par#) - parameter limit array (i.e. % sulfur upper bounds)
R(p,s) - percent recovery array
O(t,c) - order array (e.g. orders from all utilities)
ILIM(t,s,lim_type) - stockpile limits (upper and/or lower limits)
UC(t,s) - uncovered coal array
I(t=O,s) - initial stockpile array (i.e. initial inventories)
REV(t,c) - revenue array
MC(t,c,p,s) - cost of production array
IC(t,s) - cost of inventory array
XLIM - production limits (upper and/or lower limits)
X(t,c,p,s) - production array (i.e. the blends)

where
t - period number (i.e. day number)
c - utility number (i.e. contract number)
p - preparation plant number
s - coal type number (i.e. seam number)
lim_type - Up or Dn (for upper limit or lower limit)
par# - parameter number (e.g. % sulfur, % ash, Btu/lb, . . . etc.)
tl - total number of periods (e.g. 31 days) included in optimization.
cl - total number of utilities (i.e. contracts) included in optimization.
pl - total number of plants included in optimization.
sl - total number of raw coal types (i.e. seams) included in optimization.

In this manner all data types are magnetically stored and located on the magnetic disk 15 by a sequence of electric charges stored in RAM memory 13 which control this process through the microprocessor 12 by guiding the electronic data from the keyboard 11 to be stored as magnetic fluxes on the magnetic disk memory 15 and etched on the monitor screen 14 as completed results or prompts as exemplified in Table 8 and Table 9.

Once the data types are all stored by such means and in such form, they must be arranged and manipulated into a form so that a resulting set of blends which meet all of the requirements can be optimally and stable achieved.

In preparing for optimization, the user specifies the utilities, plants, coal types, parameters, and number of days that are to considered. The user specifies any limits on production or stockpiles. The user also indicates the type of optimization (minimization or maximization) of the objective parameter. The objective parameter is the parameter to be optimized. The user might choose to maximize Btu/lb, minimize percent sulfur, or optimize any other proximate parameter. However, most often the user chooses to maximize profit or minimize cost. In the later two cases the user must decide if the costs of storing the stockpiles are to be included. Once these choices are made by the user by inputs into the keyboard 11 from a list of choices displayed on the monitor screen 14, the chosen data is extracted from indexed primary databases located on the magnetic disk 15 and the data is assembled into the RAM memory 13 in a specific arrangement.

This specific arrangement is guided by specific relationships between the data that are illustrated hereinafter in Equations 1 thru 9. These relationships consider multiple coal types, multiple parameters, multiple preparation plants, multiple utilities, and multiple periods simultaneously.

An optimization array or formatted memory of parameters is constructed in the RAM memory 13. It is useful to think of this array as having two dimensions with "rows" and "columns", where each equation will occupy a row and each variable a column. The actual configuration of electrically stored data in the RAM memory 13 may be very different. It is the preferred embodiment to control the arrays through FORTRAN since the FORmula TRANslation of the relationship matches our "minds eye" view of the same. Furthermore, the Lahey brand of FORTRAN that is used in the preferred embodiment of the present invention currently provides array control into the gigabyte range. It is also the preferred embodiment to use FoxBASE+ to control most databases, indexed databases, menus, input forms, and report forms since the features are more appropriate for these tasks and since FoxBASE+ provides fixed disk control for over a billion records. FORTRAN and FoxBASE+ are well known development tools.

One main optimization array (herein referred to as the OP-array) is to be prepared from the chosen data. This array must not only incorporate all of the relationship of Equations 1 thru 9 listed below, but must also fit the restrictions of the optimization process chosen to execute it. The preferred embodiment is to use a version of a Simplex subroutine modified to use the full double precision capability of the microprocessor 12. This modified version can be found in Appendix 2 and is titled SIMPLEX. In the preferred embodiment of the present invention, the data used in equations 2 thru 9 are normalized to the smallest multiple of 10 that still retains the significant digits. This, combined with double precision processing, makes accurate processing of the large optimization array need to handle the multiple coal blending situation of the present invention possible.

The "columns" of the OP-array hold the production variables, X(t,c,p,s), listed in Table 10. The total number of these is equal to the product of: tl*cl*pl*sl. For example, if there are 31 days, 2 utilities, 2 preparation processes, and 6 coal types, the total number of production variables equals 31*2*2*6 or 744.

If separate stockpile variables, I(t,s), are used to connect the multiple periods, then tl*sl or 31*6 or 186 additional "columns" are needed. It is the preferred embodiment to avoid using these stockpile (i.e. inventory) variable explicitly and replace all references to it in terms of the uncovered coal, UC(t,c) (e.g. see Table 7), the initial stockpile inventory I(t=0,s) (e.g. see Table 1), and the production variable, X(t,c,p,s). Avoiding explicit use of the inventory variable, as expressed in Equation 1, substantially reduces both hardware RAM memory 13 requirements and greatly decreases the time required for processing the optimization by the processor 12.

$$I_{t,s} = \sum_{k=1}^{t} UC_{k,s} + I_{t=0,s} - \sum_{k=1}^{t} \left[ \sum_{c=1}^{cl} \sum_{p=1}^{pl} X_{k,c,p,s} \right]$$

Equation 1

For all $t = 1, \ldots, tl$ and $s = 1, \ldots, sl$
Inventory Equation

One more "column" is needed to hold the constraint limit values of the many constraint equations—these limit values are illustrated as the Right Hand Side (RHS) of equations 2 thru 6. the RHS of each equation occupies the first "column" in the OP-array and the production variable coefficients, located on the LHS of the equations, occupy the rest of the array. The OP-array "column" position, jjx, of a production variable coefficient is determined through the use of the locator index equation:

$$jjx = 1 + (t-1)*tc*tp*ts + (c-1)*ts + s.$$

This index equation translates a t,c,p,s index used in Equations 2 thru 9 into the single column index, jjx, of the OP-array. The coefficient in front of the production variable in Equation 2 thru 9 is placed into the column indicated by jjx.

Both the RHS and the LHS of Equations 2 thru 9 are so arranged into the RAM memory 13 OP-array from there stored locations on the magnetic memory fixed disk 15. This is the preferred embodiment of arranging the coefficients into the array since it requires the least data input from the user through keyboard 11. However, this same locator index equation in conjunction with Equations 2 thru 9 could be implemented to prompt the user for specific data as the array is built.

Track is kept of the number of "less than", "greater than", and "equal to" constraint types prior to filling the array. This avoids sorting the array by the constraint inequality types after the OP-array is filled. Then, as the relations are set up in the OP-array, the "less than" constraints are arranged in "rows" above the "greater than" constraints which are entered in "rows" above the "equal to" constraints. No "row" gaps are left and the first "row" and last "row" are reserved for the objective equation (to be optimized) and a workspace "row", respectively.

Equation 2, the conservation of output equation, illustrates the relationship that holds that the total raw production shipped must always be less than or equal to the total initial stockpile plus any uncovered coal of the same type (e.g. data from Tables 1 and 7, respectively). This relationship is implemented through tl*sl equations for all coal types and periods. Each equation is of the "less than" type. Equation 2 is also implemented to serve the important function of interrelating the multiple period stockpile inventories in the absence of inventory equations which serve the same purpose but require the additional inventory variable. It is the preferred embodiment of the present invention to substantially reduce the number of inventory equations and inventory variables due to the structure of the data and manner of interrelationship as described so as to reduce memory requirements and processing time.

$$\sum_{k=1}^{t} \left[ \sum_{c=1}^{cl} \sum_{p=1}^{pl} X_{t,c,p,s} \right] \leq \sum_{k=1}^{t} UC_{k,s} + I_{t=0,s}$$

Equation 2

For all $t = 1, \ldots, tl$ and $s = 1, \ldots, sl$
Conservation of Output

For each time period and each contract, the total of the production shipped to a particular contract must equal the amount ordered. Equation 3 guarantees this equality through tl*cl equality equations implemented for each contract in each period. R(p,s) is the percent recovery of coal type, s, processed through plant, p, and forms the LHS coefficients of the production variables in Equation 3. Typical percent recovery values can be found in Table 4. O(t,c), the orders from each utility for each day, (see the example data in Table 6) form the RHS of Equation 3. The RHS value is placed into "column 1" of the OP-array.

$$\sum_{s=1}^{sl} \sum_{p=1}^{pl} R_{p,s} * X_{t,c,p,s} = O_{t,c}$$

Equation 3

For all $t = 1, \ldots, tl$ and $c = 1, \ldots, cl$
Shipment Equals Order Identity If the user desires to limit production below a maximum amount, Xmax(t,c,p,s), or above a minimum amount, Xmin(t,c,p,s) (XLIM refers to either case in Table 10), then production, X(t,c,p,s), can be limited through Equation 4 by appropriate input of these variables through the keyboard 11. This is an optional relation and is usually used to prevent or induce the use of a particular amount of coal production of a specific coal-type through a particular preparation process to a particular utility on a given day. This features allows the user to further tailor the management of the coal production as needed. A separate equation is required for each production variable so limited.

$$X_{t,c,p,s} \leq X\max_{t,c,p,s}$$
$$X_{t,c,p,s} \geq X\min_{t,c,p,s} \geq 0$$
Production Limit Controls Equation 4

Similarly, Equation 5a is used to limit the stockpile inventory below Imax(t,s) or above Imin(t,s). ILIM refers to either variable in Table 10. This is also an optional relation with an equation required for each inventory stockpile of a specific coal type on a specific day. It is very useful in keeping the stockpile levels above or below target limits.

$$I_{t,s} \leq I\max_{t,s}$$
$$I_{t,s} \geq I\min_{t,s} \geq 0$$
Inventory Limit Controls Equation 5a Equation 5a is written in terms of the stockpile inventory variable I(t,s), but in the preferred embodiment of the present invention, this variable is eliminated and Equation 5b is introduced into the OP-array instead of Equation 5a.

$$\sum_{k=1}^{t}\left[\sum_{c=1}^{cl}\sum_{p=1}^{pl} X_{k,c,p,s}\right] \geq \sum_{k=1}^{t} UC_{k,s} + I_{t=0,s} - Imax_{t,s}$$

Equation 5b $$\sum_{k=1}^{t}\left[\sum_{c=1}^{cl}\sum_{p=1}^{pl} X_{k,c,p,s}\right] \leq \sum_{k=1}^{t} UC_{k,s} + I_{t=0,s} - Imin_{t,s}$$

Inventory Limit Controls

Since every utility requires that delivered coal meet parameter limits as exemplified in Table 5, relations constraining production to these limits are implemented. Equation 6 illustrates the relations used to limit the blended parameter values for each utility contract on each day below a maximum limit (i.e. the first inequality) or above a minimum limit (i.e. the second inequality). Therefore, tl*cl such equations are implemented into the OP-array to constrain a blended parameter within its limits. The LHS shows the coefficients of the production variables, whereas the RHS shows the upper and lower limits: PARmax(t,c) and PARmin(t,c), respectively. Both of these upper or lower limit types are listed as PARL(t,c,lim_type, par#) in Table 10. The last two index variables: lim_type and par#, are used to locate the parameter limits within the hierarchical database structure. For example, the database containing the parameter limit for each utility contract and each day also denotes the type of parameter limit by lim_type (which could be either upper or lower) and the parameter type by par#. If percent sulfur is designated by a parameter number of 1, then par# = 1.

$$\sum_{p=1}^{pl}\sum_{s=1}^{sl}\left(\left[\frac{PAR_{t,p,s} * R_{p,s}}{O_{t,c}}\right] * X_{t,c,p,s}\right) \leq PARmax_{t,c}$$

Equation 6

For $t = 1, \ldots, tl$ and $c = 1, \ldots, cl$ $$\sum_{p=1}^{pl}\sum_{s=1}^{sl}\left(\left[\frac{PAR_{t,p,s} * R_{p,s}}{O_{t,c}}\right] * X_{t,c,p,s}\right) \geq PARmin_{t,c}$$

For $t = 1, \ldots, tl$ and $c = 1, \ldots, cl$

Parameter Constraints

After all of the constraint relationships are arranged within the OP-array in the specific manner described, the objective relation is arranged in the first "row" of the OP-array. The objective relation is the equation that is either maximized or minimized as a result of optimization. Equations 7, 8, and 9 represent the main alternative objective relations used. Equations 7 and 9 represents the preferred embodiment alternatives.

The choice to use Equation 7 or Equation 9 is made electroncially and automatically after the user chooses to maximize or minimize a parameter—Equation 7 or to maximize profit—Equation 9. Then the RHS of the appropriate equation is arranged into the array. The LHS, labeled: P, in both equations is determined from the optimization process.

Equation 7 is the objective equation in terms of parameter coefficients of the production variable. This relation is used to arrange the first "row" of the OP-array with parameter coefficients if the user chooses to maximize Btu/lb, minimize percent Sulfur or any other similar parameter.

$$P = \sum_{t=1}^{tl}\sum_{c=1}^{cl}\left\{\sum_{p=1}^{pl}\sum_{s=1}^{sp}\left[\frac{PAR_{t,p,s} * R_{p,s}}{O_{t,c}}\right] * X_{t,c,p,s}\right\}$$

Equation 7

Objective Parameter Equation

Equation 8 is the objective equation for profit as a function of all revenues and costs, except for inventory costs. The preferred embodiment of the present invention implements Equation 9, since the two equations are identical if inventory costs, IC(t,s), equal zero. If the user wishes to maximize profit and consider inventory costs, this is accomplished by implementing Equation 9 to organize the first "row" of the optimization array.

$$P = \sum_{t=1}^{tl}\sum_{c=1}^{cl}\left\{\sum_{p=1}^{pl}\sum_{s=1}^{sl}(R_{t,c} - C_{t,c,p,s}) * R_{p,s} * X_{t,c,p,s}\right\}$$

Equation 8

Profit without Inventory Costs $P = A + B - C$ where:

Equation 9

$$A = \sum_{t=1}^{tl}\sum_{c=1}^{cl}\left\{\sum_{p=1}^{pl}\sum_{s=1}^{sl}(R_{t,c} - C_{t,c,p,s}) * R_{p,s} * X_{t,c,p,s}\right\}$$

$$B = \sum_{s=1}^{sl}\sum_{t=1}^{tl}\left[\left(\sum_{c=1}^{cl}\sum_{p=1}^{pl} X_{t,c,p,s}\right) * \left(\sum_{k=t}^{tl} IC_{k,s}\right)\right]$$

$$C = \sum_{s=1}^{sl}\left\{\left[\sum_{t=1}^{tl} U_{t,s} * \left(\sum_{k=1}^{tl} IC_{k,s}\right)\right] + I_{t=0,s} * \left(\sum_{t=1}^{tl} IC_{t,s}\right)\right\}$$

Profit with Inventory Costs

After the OP-array is fully organized and the optimization completely executed through the modified subroutine SIMPLX, the user can generate reports of the results as illustrated in Table 11 and Appendix 1 or check the stability of the resulting blends as illustrated in Table 12.

For each utility contract and each day, the stability of each blend can be analyzed. The user is promoted by messages on the monitor screen 14 for the Maximum Blend Variance. The size of the Maximum Blend Variance determines the range of near optimal blends that are tested with each parameter constraint. Table 13 illustrates the procedure used to determine the near optimal blends.

TABLE 11

An Optimization Report.

The OPTIMAL BLEND was chosen to:
(1) yield blended parameters within the listed safe and contract limits,
(2) and MINIMIZE the COST/TON
For Utility 2 and Period 10

| SEAM NUM | OPTIMAL BLEND | COST/ TON | AVAIL- ABLE TONS | APPOR- TIONED TONS | TOTAL TONS*COST/TON | PERCENT SULFUR | PERCENT BTU/LB |
|---|---|---|---|---|---|---|---|
| CONTRACT MAX LIMIT: | | | | | | 3.25 | |
| SAFE MAXIMUM LIMIT: | | | | | | 3.25 | |
| BLENDED VALUE: | | 18.55 | 166,000.0 | 10,000.0 | 185,500.00 | 2.53 | 11100.00 |
| SAFE MINIMUM LIMIT: | | | | | | | 11100.00 |
| CONTRACT MIN LIMIT: | | | | | | | 11100.00 |
| 1 | 2.50 | 21.3 | 40,000.0 | 250.0 | 5,337.50 | 2.75 | 11200.00 |
| 2 | 0.00 | 22.4 | 20,000.0 | 0.0 | 0.00 | 2.10 | 11000.00 |
| 3 | 50.00 | 20.0 | 5,000.0 | 5,000.0 | 100,250.00 | 1.90 | 11150.00 |
| 4 | 0.00 | 25.0 | 20,000.0 | 0.0 | 0.00 | 1.40 | 10900.00 |
| 5 | 37.50 | 19.0 | 40,000.0 | 3,750.0 | 71,250.00 | 3.50 | 11000.00 |
| 6 | 0.00 | 9.0 | 20,000.0 | 0.0 | 0.00 | 2.20 | 10000.00 |
| 7 | 0.00 | 7.0 | 10,000.0 | 0.0 | 0.00 | 1.90 | 9000.00 |
| 8 | 10.00 | 8.6 | 1,000.0 | 1,000.0 | 8,650.00 | 1.95 | 11200.00 |
| 9 | 0.00 | 11.5 | 10,000.0 | 0.0 | 0.00 | 2.25 | 10100.00 |

TABLE 12

A Stability Report.
STABILITY STATISTICS
Util: 2 Per: 10

| MAXIMUM BLEND % VARIANCE | TOTAL # OF BLEND VARIATIONS | TOTAL VARIATION FAILURES | OVERALL FAILURE PERCENT | OPTIMAL BLEND COST/TON |
|---|---|---|---|---|
| (+/−)5 | 723 | 325 | 44.95 | 18.55 |

| PARAMETER NAME | LIMIT TYPE | CONTRACT LIMIT | OVERALL MAXIMUM | OVERALL MINIMUM | OVERALL MEAN | PARAMETER FAILURES |
|---|---|---|---|---|---|---|
| COST/TON | | | 19.24 | 17.92 | 18.63 | |
| ASH | Upper | 10.00 | 9.45 | 9.31 | 9.38 | 0 |
| MOISTURE | Upper | 12.00 | 9.64 | 9.38 | 9.50 | 0 |
| SULFUR | Upper | 3.25 | 2.65 | 2.43 | 2.54 | 0 |
| BTU/LB | Lower | 11100.00 | 11111.50 | 11088.00 | 11100.39 | 325 |
| TEMP | Lower | 2000.00 | 2175.00 | 2161.50 | 2168.17 | 0 |

PRINT Stability Statistics (Y/N)? N

Assume for simplicity that there are 3 raw coal types to meet one utility order for 1 day and the coals are blended raw. Assume that after optimization, the optimal blend is: (33%, 33%, 34%). The 1 percent near optimal blends can be determined by a counting process illustrated in Table 13. Each near optimal blend must equal 100% and these are calculated and listed in Table 13. For these near optimal blends, blended parameter values are determined as a weighted average of each blend fraction and the respective parameter value for each coal type. For example, if the coal types have the percent sulfur values: (3%, 3%, 4%), then the near optimal percent sulfur values are illustrated in Table 13 (e.g. 3.34% sulfur for the 33%, 33%, 34% optimal blend).

TABLE 13

Basic Stability Algorithm

| | C1 | C2 | C3 |
|---|---|---|---|
| OPTIMAL BLEND: | 33 | 33 | 34 |
| COAL TYPE % SULFUR: | 3 | 3 | 4 |

| VARIATION PERCENT | | | NEAR OPTIMAL BLEND | | | % SULFUR |
|---|---|---|---|---|---|---|
| C1 | C2 | C3 | | | | |
| −1 | −1 | −1 | | | | |
| −1 | −1 | 0 | | | | |
| −1 | −1 | 1 | | | | |
| −1 | 0 | −1 | | | | |
| −1 | 0 | 0 | | | | |
| −1 | 0 | 1 | 32 | 33 | 35 | 3.35 |

TABLE 13-continued

Basic Stability Algorithm

| −1 | 1 | −1 | | | | |
|---|---|---|---|---|---|---|
| −1 | 1 | 0 | 32 | 34 | 34 | 3.34 |
| −1 | 1 | 1 | | | | |
| 0 | −1 | −1 | | | | |
| 0 | −1 | 0 | | | | |
| 0 | −1 | 1 | 33 | 32 | 35 | 3.35 |
| 0 | 0 | −1 | | | | |
| 0 | 0 | 0 | 33 | 33 | 34 | 3.34 |
| 0 | 0 | 1 | | | | |
| 0 | 1 | −1 | 33 | 34 | 33 | 3.33 |
| 0 | 1 | 0 | | | | |
| 0 | 1 | 1 | | | | |
| 1 | −1 | −1 | | | | |
| 1 | −1 | 0 | 34 | 32 | 34 | 3.34 |
| 1 | −1 | 1 | | | | |
| 1 | 0 | −1 | 34 | 33 | 33 | 3.33 |
| 1 | 0 | 0 | | | | |
| 1 | 0 | 1 | | | | |
| 1 | 1 | −1 | | | | |
| 1 | 1 | 0 | | | | |
| 1 | 1 | 1 | | | | |

A similar stability process is used to determine valid near optimal blends and their parameter values. Then it compares these near optimal parameter values to the utility contract upper or lower limits for the same parameter. The results are summarized for each parameter (e.g. there are 2 failures out of 7 in Table 13 if the upper limit is 3.34% sulfur). In this manner the near optimal failure percentages are calculated and then accumulated for each parameter of each contract by each day as illustrated in Table 12.

If the failure rates are high, the user can reset the upper and lower parameter limits (i.e. lower the upper limits and raise the lower limits) and reoptimize. The new set of blends are not as optimal as the first, but are usually more stable.

Easy modification of the parameter limits is available from parameter modification screens on the monitor screen 14 illustrated in Table 14. This makes it easy for the user to optimize, check the stability results, modify the parameter limits through input through keyboard 11 for reoptimization, etc. until the user is satisfied with the stable optimal set of blends.

To calculate the stability, the original contract parameter limits are used, but for optimization, the modified parameter limits are used—i.e. safe limits. The safe parameter limits are equal to the contact parameter limits unless modified by the user through the keyboard 11 from a screen displayed on monitor 14 as illustrated in Table 14.

TABLE 14

Increase the Btu/lb Safe Lower Bound
CONTRACT AND SAFE PARAMETER BOUNDS:
Util: 2 Per: 10

| PARAMETER NAME | PARAM TYPE | CONTRACT BOUND | SAFE BOUND | MARGIN PERCENT |
| --- | --- | --- | --- | --- |
| ASH | Upper | 10.00 | 10.00 | 0.00 |
| MOISTURE | Upper | 12.00 | 12.00 | 0.00 |
| SULFUR | Upper | 3.25 | 3.25 | 0.00 |
| BTU/LB | Lower | 11100.00 | 11105.00 | 0.04 |
| TEMP | Lower | 2000.00 | 2000.00 | 0.00 |

Appendix 2 provides an example listing of the FORTRAN source code used to generate the report illustrated in Appendix 1. This is the simultaneous multiple period, multiple seam case with staggered multiple utilities and only one plant process. The only parameter restriction was percent sulfur with an upper limit of 4.0% for orders of 5000 tons and 4.2% for orders of 10,000 tons. In this optimization, percent sulfur was also the maximized objective parameter. The goal of this configuration was to use as much high sulfur coal as possible without exceeding the required limits. Also, no coal was assumed available for the 6th coal type. It represented a low sulfur coal which would be purchased from an outside mine if required to meet constraints. As the report shows, it is not needed over the entire 31 day period (i.e. the mines own coals are sufficient if properly managed over the 31 day period).

Notice also that the starting inventory of coal type 1 on the 29th day is 50,000 tons. This was imposed by a constraint specifying that this inventory be less than or equal to 50,000 tons and was implemented through the first relation of Equation 5b. Appendix 3 is a FORTRAN source code listing of the stability analysis processed by processor 12 which is used iteratively for the multiple contract and multiple period blends.

For many preparation plants coal is blended prior to the preparation cleaning process. In this cases, the separate percentage of recovery for each coal type processed and the proximate parameter data such as percentage of sulfur for each coal type can not be directly determined. One alternative is to use direct historical data quantities which are based on coal prepared separately. However, this historical data may based on data which does not accurately represent the coal being currently processed since parameter values change with the location of the coal type in the mine.

Another alternative is to indirectly measure a combined parameter that combine a product of the percentage of recovery with the percentage of a parameter such as $R(p,s)*PAR(t,p,s,par\#)$ from Table 10. It is this product which is used in the Equation 6 and hence a knowledge of the separate parameter quantities can be bypassed if the product itself is determined. In the preferred embodiment of the present invention the user can obtain these indirect product quantities stochastically processed from a modified form of a singular value decomposition processed by the microprocessor 12.

After preparation processing of blends of similar coal types, and after analysing these resulting blends for their overall percentages of Recovery and proximate parameter values, the user inputs these values into the keyboard 11. The blended combinations are then processed by a double precision singular value decomposition where the stochastic residuals are minimized in the least squares sense. The preferred embodiment is to use a version of the singular value decomposition modified to use full double precision capability of the microprocessor 12. This modified version can be found in Appendix 4 and is tilted SVDCMP. Subroutine restrictions that are not mentioned herein can be acquired from its prior version listed in a text by William H. Press et. al. titled "Numerical Recipes".

Table 15 shows the relationships of the data required to minimize the residuals of the stochastic data. Matrix A, the matrix of raw coal blend amounts with blend types in "columns" and temporally sequential blends in "rows", is organized by the microprocessor 12 from the data values input by the user from keyboard 11 and stored on the magnetic memory 15. The vector array, b, is created in RAM by the microprocessor and consists of products of the overall percentage value of the clean coal blend and a proximate parameter value for the respective blend, with each "row" of b representing a different temporally sequential product of the respective clean coal blend.

After processing by the microprocessor 12, x in Table 15 represents the products, $R(p,s)*PAR(t,p,s,par\#)$, where each "row" is distinguished by a particular coal type used in each of the temporally sequential blends. These products are then saved to the magnetic fixed disk 15 for use latter recall by the microprocessor 12 to be used as input to determine the next optimal and stable blend.

The process of using the singular value decomposition has advantages of treating the collected data from the previous blends as stochastic data, which they are, rather than deterministic data to be processed by a gaussian inversion. Furthermore, if other methods are used such as normal processing of a multiple regression design matrix, then processing errors may greatly skew the results due to microprocessor 12 round off errors, any linear dependence inherent in the data causing a more singular matrix A within the RAM memory 13, or measurement errors within the data. Since the microprocessor 12 processes this data for the user from the magnetic disk 15, this novel approach to processing the data is the preferred embodiment of the present invention its reliability minimizes any error magnification in the microprocessor 12.

The user can use as few blends or as many blends as desired, but it is suggested (but not required) to use at least as many temporal blends as there are coal types used in each blend. The least squares minimization of r in Table 15 guarantees that the best stochastic approximation of the products, x, is achieved in the microprocessor 12.

TABLE 15

Singular Value Decomposition of Blend Matrix

Consider $Ax = b$ where: $A$ = matrix of coal blends,
$x$ = parameters of each coal type,
$b$ = parameter from each blend
and $k$ is the rank of m-by-n matrix, $A$.

The matrix A can be decomposed such that:
$A = U\,S\,W\,S\,V$ where: $U$ is a m-by-m orthogonal matrix,
$W$ is a m-by-n diagonal matrix, and
$V$ is a n-by-n orthogonal matrix.

The aim is to find the parameters of each coal type, x, such that:
$r = \|\,Ax - b\,\|$ is at a minimum in the least squares sense.
However,
$r = \|\,Ax - b\,\| = \|\,U\,S\,W\,S\,V^t x - b\,\| =$ $\|\,U^t\,S\,U\,S\,W\,S\,V^t x - U^t b\,\|$ $= \|\,W\,S\,V^t x - U^t b\,\| = \|\,Wz - d\,\| = \left|\sum_{j=1}^{m}(w_j z_j - d_j)\right| =$ $\sum_{j=k}^{m} d_j^2$ The product estimates, x in Table 15, can be used in the preferred embodiment of the optimization process to determine the next optimal and stable blend which is reported on printer 16. After which the resulting blend of bulk coal can be reanalyzed by the preferred embodiment of the parameter stochastic estimation process together with the previous bulk blends of coal. These two processes of optimization and stochastic estimation form a coupled routine that is ever repeating with each providing new data to be used in the processing of the other.

But in every case, once the user has obtained required blending ratios from the output screen 14, the user can print such output through printer output 16. The ratios are then used to mix the actual coal to obtain the prescribed and optimal blends.

Wherefore, while there have been described above the principals of this invention in accordance with specific apparatus and techniques, it is to be clearly understood that this description is made only by way of an example and not as a limitation to the scope of the invention.

APPENDIX 1

Appendix 2

```
      PROGRAM STRIP
      DOUBLE PRECISION B(295),UC(31,9),ORD(31),CC(31,9),IC(31,9),
     1 INV(0:31,9),X(295,20),PARLIM,EPS
      DIMENSION IZROV(100),IPOSV(100)
      INTEGER STAT(30)
      CHARACTER*9 LTFILE(10),GTFILE(10)
      COMMON EPS
***   ENTER THE STATUS FILE***
*       Mdim=295
*       Ndim=20
      NP=20
      MP=295
      OPEN(4,FILE="STAT.TXT",STATUS="OLD")
      I=1
 10   READ(4,*,END=20) STAT(I)
      I=I+1
      GO TO 10
 20   CONTINUE
      nper=stat(1)
      ntype=stat(2)
      nltfiles=stat(3)
      ngtfiles=stat(4)
      nxmin=stat(5)
      nxmax=stat(6)
      nimin=stat(7)
      nimax=stat(8)
      neps=stat(9)
      opt=stat(10)
      iprtit=stat(11)
      numless=2*ntype+2*(ntype*(nper-1))+nper+nltfiles*nper+nxmax+
     1 nimax
      numgreat=ntype+ntype*(nper-1)+nper+ngtfiles*nper+nxmin+
     1 nimin
      M1=numless
      M2=numgreat
      M3=0
      N=nper*ntype*2
      M=numless+numgreat
      EPS=1.0D0/10**neps
      IF (IPRTIT.EQ.1) THEN
         PRINT 900,NP,MP,N,M,M1,M2,M3,EPS,OPT,IPRTIT
      ENDIF
      If (M+2.GT.MP) THEN
         PRINT *,"THE DIMENSION LIMITS TOO SMALL !!!"
      Endif
***   UNCOVERED COAL FROM EACH PERIOD AND COAL TYPE
      OPEN(3,FILE="DAT1.TXT",STATUS="OLD")
      DO 30 J=1,ntype
         READ(3,*)INV(0,J)
 30   CONTINUE
      CLOSE(3,FILE="DAT1.TXT")
***   ENTER THE INVENTORY FROM PREVIOUS MONTH
      OPEN(3,FILE="DAT2.TXT",STATUS="OLD")
      DO 40 I=1,nper
        DO 35 J=1,ntype
          READ(3,*) UC(I,J)
 35   CONTINUE
 40   CONTINUE
      CLOSE(3,FILE="DAT2.TXT")
***   ENTER THE ORDERS FOR EACH PERIOD
      OPEN(3,FILE="DAT3.TXT",STATUS="OLD")
      DO 42 I=1,nper
         READ(3,*) ORD(I)
 42   CONTINUE
      CLOSE(3,FILE="DAT3.TXT")
```

```
***   ENTER THE COAL COSTS FOR EACH Period and Coal type
      OPEN(3,FILE="DAT4.TXT",STATUS="OLD")
        DO 50 I=1,nper
          DO 45 j=1,ntype
            READ(3,*) CC(I,J)
   45   CONTINUE
   50 CONTINUE
      CLOSE(3,FILE="DAT4.TXT")
***   ENTER THE INVENTORY COSTS FOR EACH Period and Coal type
      OPEN(3,FILE="DAT5.TXT",STATUS="OLD")
        DO 60 I=1,nper
          DO 55 j=1,ntype
            READ(3,*) IC(I,J)
   55   CONTINUE
   60 CONTINUE
      CLOSE(3,FILE="DAT5.TXT")
      mrt=2
      mrb=numless+2
      mless=0
      mgreat=0
      jjb=1
***   ENTER THE PERIOD RELATIONSHIP FOR PERIOD 1 - to restrict
***   the period 1 produced amounts for each coal type.
      i=1
      DO 105 j=1,ntype
         ii=mrt
         jjx=(i-1)*ntype+j+1
         X(ii,jjx)=1.0D0
         X(ii,jjb)=INV(0,j)+UC(1,j)
         mrt=mrt+1
         mless=mless+1
  105 CONTINUE
***   ENTER THE PERIOD RELATIONSHIP FOR PERIOD 1 - to determine the
***   ending inventory for period 1 for each coal type.
      i=1
      DO 110 j=1,ntype
         jji=nper*ntype+(i-1)*ntype+j+1
         jjx=(i-1)*ntype+j+1
*     begin less than equation
         ii=mrt
         X(ii,jjx)=1.0D0
         X(ii,jji)=1.0D0
         X(ii,jjb)=INV(0,j)+UC(1,j)
         mless=mless+1
         mrt=mrt+1
*     begin greater than equation
         ii=mrb
         X(ii,jji)=1.0D0
         X(ii,jjx)=1.0D0
         X(ii,jjb)=INV(0,j)+UC(1,j)
         mrb=mrb+1
         mgreat=mgreat+1
  110 CONTINUE
***   ENTER THE PERIOD RELATIONSHIP FOR PERIODS: (2-nper) to restrict
***   the period 1 produced amounts for each coal type.
      DO 120 i=2,nper
        DO 115 j=1,ntype
           jji=nper*ntype+(i-1)*ntype+j+1
           jjim1=nper*ntype+(i-2)*ntype+j+1
           jjx=(i-1)*ntype+j+1
           ii=mrt
           X(ii,jjx)=1.0D0
           X(ii,jjim1)=-1.0D0
           X(ii,jjb)=UC(i,j)
           mrt=mrt+1
           mless=mless+1
***   ENTER THE PERIOD RELATIONSHIP FOR PERIOD 1 - to determine the
```

```
***     ending inventory for period 1 for each coal type.
*         begin less than equation
            ii=mrt
            X(ii,jjx)=1.0D0
            X(ii,jjim1)=-1.0D0
            X(ii,jji)=1.0D0
            X(ii,jjb)=UC(i,j)
            mless=mless+1
            mrt=mrt+1
*         begin greater than equation
            ii=mrb
            X(ii,jjx)=1.0D0
            X(ii,jjim1)=-1.0D0
            X(ii,jji)=1.0D0
            X(ii,jjb)=UC(i,j)
            mrb=mrb+1
        IF (nxmin.gt.0) THEN
         OPEN(3,FILE="DAT6.TXT",STATUS="OLD")
         DO 185 k=1,nxmin
          READ (3,*) X(mrb,jjb),i,j
          jjx=(i-1)*ntype+j+1
          X(mrb,jjx)=1.0D0
          mrb=mrb+1
          mgreat=mgreat+1
  185    CONTINUE
         CLOSE(3,FILE='DAT6.TXT')
        ENDIF
***     Enter the maximum values of production for each coal type and period.
        IF (nxmax.gt.0) THEN
         OPEN(3,FILE="DAT7.TXT",STATUS="OLD")
         DO 190 k=1,nxmax
          READ (3,*) X(mrt,jjb),i,j
          jjx=(i-1)*ntype+j+1
          X(mrt,jjx)=1.0D0
          mrt=mrt+1
          mless=mless+1
  190    CONTINUE
         CLOSE(3,FILE='DAT7.TXT')
        ENDIF
***     Enter the minimum values of production for each coal type and period.
        IF (nimin.gt.0) THEN
         OPEN(3,FILE="DAT8.TXT",STATUS="OLD")
         DO 195 k=1,nimin
          READ (3,*) X(mrb,jjb),i,j
          jji=nper*ntype+(i-1)*ntype+j+1
          X(mrb,jji)=1.0D0
          mrb=mrb+1
          mgreat=mgreat+1
  195    CONTINUE
         CLOSE(3,FILE='DAT8.TXT')
        ENDIF
***     Enter the maximum values of production for each coal type and period.
        IF (nimax.gt.0) THEN
         OPEN(3,FILE="DAT9.TXT",STATUS="OLD")
         DO 200 k=1,nimax
          READ (3,*) X(mrt,jjb),i,j
          jji=nper*ntype+(i-1)*ntype+j+1
          X(mrt,jji)=1.0D0
          mrt=mrt+1
          mless=mless+1
  200    CONTINUE
         CLOSE(3,FILE='DAT9.TXT')
        ENDIF
*******************************************
****    Prepare for simplex routine
        IF (OPT.EQ.-1.) THEN
         DO 205 J=2,N+1
          X(1,J)=-X(1,J)
```

```
205     CONTINUE
        ENDIF
        DO 208 I=1,M+1
         DO 207 J=2,N+1
           IF((I.GT.1).AND.(J.GT.1)) THEN
             X(I,J)=-X(I,J)
           ENDIF
207     CONTINUE
C       READ(5,*,END=1) (X(I,J), J=1,N+1)
        IF (IPRTIT.EQ.1) THEN
          PRINT 900, (X(I,J), J=1,N+1)
        ENDIF
208     CONTINUE
****    Run Simplex routine.
        CALL SIMPLX(X,M,N,MP,NP,M1,M2,M3,ICASE,IZROV,IPOSV,IPRTIT)
***     Report results and output to datafiles.
        IF (IPRTIT.EQ.1) THEN
          PRINT, 'THIS IS ICASE:',ICASE
        ENDIF
        OPEN(8,FILE="SOLUSTAT.TXT",STATUS="NEW")
        WRITE(8,890) ICASE
        CLOSE(8)
C       IF (ICASE .EQ. 0) THEN
         DO 220 I=1,M+2
*          A(I,1)=A(I,1)*100
           IF (IPRTIT.EQ.1) THEN
             PRINT 900, (X(I,J), J=1,N+1)
           ENDIF
220     CONTINUE
        IF (IPRTIT.EQ.1) THEN
          PRINT 900, (IZROV(J),J=1,N)

PRINT 900, (IPOSV(J),J=1,M)
        ENDIF
        OPEN (7,FILE="BLEND.TXT",STATUS="NEW")
        DO 230 J=1,M
          IF (IPOSV(J).LE.M)THEN
             B(IPOSV(J))=X(J+1,1)
          ENDIF
          IF (J.LE.N)THEN
            IF (IZROV(J).LE.N)THEN
              B(IZROV(J))=0
            ENDIF
          ENDIF
230     CONTINUE
        DO 240 J=1,N
          WRITE(7,850)J,B(J)
240     CONTINUE
        CLOSE(7)
*******************************************
***** Print Block ******
  850     FORMAT(I3,1X,F12.8)
  890     FORMAT(I3)
  900 FORMAT(1X,20F12.2)
        PRINT *, "objective equation "
        I=1
        WRITE(6,999) (X(I,J), J=1,ntype*nper*2+1),I
        PRINT *, "mless= ", mless
        DO 940 I=2,2+mless-1
*         DO 920 J=1,ntype*nper
          WRITE(6,999) (X(I,J), J=1,ntype*nper*2+1),I
*   920 CONTINUE
    940 CONTINUE
        PRINT *, "mgreat= ",mgreat
        DO 950 I=numless+2,numless+2+mgreat-1
          WRITE(6,999) (X(I,J), J=1,ntype*nper*2+1),I
    950 CONTINUE
```

```
  999 FORMAT (1X,20F9.1,3x,I3)
      STOP
      END
***********************************************************************
*                                                                     *
      SUBROUTINE SIMPLX(A,M,N,MP,NP,M1,M2,M3,ICASE,IZROV,IPOSV,IPRTIT)
*                                                                     *
***********************************************************************
C      ** Simplex method for linear programming.
C      ** Input parameters: A,M,N,MP,NP,M1,M2 and M3.
C      ** Output parameters: A,ICASE,IZROV and IPOSV
      PARAMETER(MMAX=295)
C      * MMAX is the maximum number of constraints expected.
      DIMENSION IZROV(N),IPOSV(M),L1(MMAX),L2(MMAX),L3(MMAX)
      DOUBLE PRECISION A(MP,NP),Q1,BMAX,EPS
      COMMON EPS
      IF (IPRTIT.EQ.1) THEN
         IF(M.NE.M1+M2+M3)PAUSE 'Bad input constraint counts.'
      ENDIF
C     PRINT , "IN SUBROUTINE SIMPLX"
C     DO 1010 I=1,M+2
C     PRINT 100, (A(I,J), J=1,N+1)
C1010 CONTINUE
      NL1=N
      DO 11 K=1,N
        L1(K)=K
        IZROV(K)=K
   11 CONTINUE
      NL2=M
      DO 12 I=1,M
        IF (IPRTIT.EQ.1) THEN
          IF (A(I+1,1).LT.0.)PAUSE 'BAD INPUT TABLEAU'
        ENDIF
C       * ZERO IN ABOVE DOESN'T HAVE TO BE DOUBLE PRECISION
        L2(I)=I
        IPOSV(I)=N+I
   12 CONTINUE
      DO 13 I=1,M2
        L3(I)=1
   13 CONTINUE
      IR=0
      IF(M2+M3.EQ.0) GO TO 30
      IR=1
      DO 15 K=1,N+1
        Q1=0.0
          DO 14 I=M1+1,M Q1=Q1+A(I+1,K)
   14     CONTINUE
        A(M+2,K)=-Q1
   15 CONTINUE
C        DO 110 I=1,M+2
C        PRINT 100, (A(I,J), J=1,N+1)
C 110    CONTINUE
  100    FORMAT (1X,20F12.2)
        IF (IPRTIT.EQ.1) THEN
           PAUSE
        ENDIF
   10 CALL SIMP1(A,MP,NP,M+1,L1,NL1,0,KP,BMAX)
        IF (BMAX.LE.EPS.AND.A(M+2,1).LT.-EPS)THEN
          ICASE=-1
          RETURN
        ELSE IF(BMAX.LE.EPS.AND.A(M+2,1).LE.EPS)THEN
          M12=M1+M2+1
          IF (M12.LE.M)THEN
            DO 16 IP=M12,M
              IF(IPOSV(IP).EQ.IP+N)THEN
```

```
              CALL SIMP1(A,MP,NP,IP,L1,NL1,1,KP,BMAX)
              IF(BMAX.GT.O.)GO TO  1
            ENDIF
16      CONTINUE
      ENDIF
      IR=0
      M12=M12-1
      IF(M1+1.GT.M12)GO TO 30
      DO 18 I=M1+1,M12
         IF(L3(I-M1).EQ.1)THEN
            DO 17 K=1,N+1
               A(I+1,K)=-A(I+1,K)
17       CONTINUE
         ENDIF
18    CONTINUE
      GO TO 30
    ENDIF
    CALL SIMP2(A,M,N,MP,NP,L2,NL2,IP,KP,Q1)
    IF(IP.EQ.0)THEN
       ICASE=-1
       RETURN
    ENDIF
 1  CALL SIMP3(A,MP,NP,M+1,N,IP,KP)
    IF(IPOSV(IP).GE.N+M1+M2+1) THEN
       DO 19 K=1,NL1
          IF (L1(K).EQ.KP)GO TO 2
19     CONTINUE
 2     NL1=NL1-1
       DO 21 IS=K,NL1
          L1(IS)=L1(IS+1)
21     CONTINUE
    ELSE
       IF(IPOSV(IP).LT.N+M1+1)GO TO 20
       KH=IPOSV(IP)-M1-N
       IF(L3(KH).EQ.0)GO TO 20
       L3(KH)=0
    ENDIF
    A(M+2,KP+1)=A(M+2,KP+1)+1.
    DO 22 I=1,M+2
            A(I,KP+1)=-A(I,KP+1)
    22 CONTINUE
    20 IS=IZROV(KP)
       IZROV(KP)=IPOSV(IP)
       IPOSV(IP)=IS
       IF(IR.NE.0)GO TO 10
    30 CALL SIMP1(A,MP,NP,0,L1,NL1,0,KP,BMAX)
       IF(BMAX.LE.0)THEN
          ICASE=0
          RETURN
       ENDIF
       CALL SIMP2(A,M,N,MP,NP,L2,NL2,IP,KP,Q1)
       IF(IP.EQ.0)THEN
          ICASE=1
          RETURN
       ENDIF
       CALL SIMP3(A,MP,NP,M,N,IP,KP)
       GO TO 20
       END
***************************************************************
*
*      SUBROUTINE SIMP1(A,MP,NP,MM,LL,NLL,IABF,KP,BMAX)
*
*
***************************************************************
       DIMENSION LL(NP)
       DOUBLE PRECISION A(MP,NP),BMAX,TEST
       KP=LL(1)
       BMAX=A(MM+1,KP+1)
       IF (NLL.LT.2)RETURN
```

```
      DO 11 K=2,NLL
      IF(IABF.EQ.0)THEN
        TEST=A(MM+1,LL(K)+1)-BMAX
      ELSE
        TEST=DABS(A(MM+1,LL(K)+1))-DABS(BMAX)
      ENDIF
      IF(TEST.GT.0.)THEN
        BMAX=A(MM+1,LL(K)+1)
        KP=LL(K)
      ENDIF
11    CONTINUE
      RETURN
      END
***********************************************************************
*
      SUBROUTINE SIMP2(A,M,N,MP,NP,L2,NL2,IP,KP,Q1)
*
***********************************************************************
*     PARAMETER (EPS=1.E-6)
      DIMENSION L2(MP)
      DOUBLE PRECISION A(MP,NP),EPS,Q1,Q,QP,Q0
      COMMON EPS
      IP=0
      IF(NL2.LT.1)RETURN
      DO 11 I=1,NL2
        IF(A(L2(I)+1,KP+1).LT.-EPS)GO TO 2
11    CONTINUE
      RETURN
 2    Q1=-A(L2(I)+1,1)/A(L2(I)+1,KP+1)
      IP=L2(I)
      IF(I+1.GT.NL2)RETURN
      DO 13 I=I+1,NL2
        II=L2(I)
        IF(A(II+1,KP+1).LT.-EPS)THEN
          Q=-A(II+1,1)/A(II+1,KP+1)
          IF(Q.LT.Q1)THEN
            IP=II
            Q1=Q
          ELSE IF (Q.EQ.Q1)THEN
            DO 12 K=1,N
              QP=-A(IP+1,K+1)/A(IP+1,KP+1)
              Q0=-A(II+1,K+1)/A(II+1,KP+1)
              IF(Q0.NE.QP)GO TO 6
12          CONTINUE
 6          IF (Q0.LT.QP)IP=II
          ENDIF
        ENDIF
13    CONTINUE
      RETURN
      END
***********************************************************************
*
      SUBROUTINE SIMP3(A,MP,NP,I1,K1,IP,KP)
*
***********************************************************************
      DOUBLE PRECISION A(MP,NP),PIV
      PIV=1./A(IP+1,KP+1)
      IF(I1.GE.0)THEN
        DO 12 II=1,I1+1
          IF (II-1.NE.IP)THEN
            A(II,KP+1)=A(II,KP+1)*PIV
            DO 11 KK=1,K1+1
              A(II,KK)=A(II,KK)-A(IP+1,KK)*A(II,KP+1)
          ENDIF
11        CONTINUE
          ENDIF
12      CONTINUE
      ENDIF
```

```
      DO 13 KK=1,K1+1
         IF(KK-1.NE.KP) A(IP+1,KK)=-A(IP+1,KK)*PIV
   13 CONTINUE
      A(IP+1,KP+1)=PIV
      RETURN
      END
***********************************************************************
*                                                                     *
      SUBROUTINE RITE(NB,M,N,L,A)
*                                                                     *
***********************************************************************
*     NONDUMMY DIMENSION B(30)
      DIMENSION B(30)
      DIMENSION A(M,N,L)
*     FOR COMPLEX VERSION REMOVE THE C FROM COL 1 OF NEXT CARD
C     COMPLEX A,B
      LL=L
      K1=-NB+1
      K2=0
    1 LLL=LL-NB
      IF(LLL.LT.0) GO TO 4
      K1=K1+NB
      K2=K2+NB
      DO 3 I=1,M
      II=0
      DO 2 K=K1,K2
      DO 2 J=1,N
      II=II+1
    2 B(II)=A(I,J,K)
      NBN=NB*N
    3 PRINT 100, (B(II),II=1,NBN)
      PRINT 25
   25 FORMAT (1H0)
      LL=LLL
      IF(LL.EQ.0) GO TO 7
      GO TO 1
    4 K1=K1+NB
      K2=K2+LL
      DO 6 I=1,M
      II=0
      DO 5 K=K1,K2
      DO 5 J=1,N
      II=II+1
    5 B(II)=A(I,J,K)
      LLN=LL*N
    6 PRINT 100, (B(II),II=1,LLN)
    7 PRINT 25
C     FOR COMPLEX VERSION REPLACE NEXT CARD BY A COMP. FORMAT
  100 FORMAT(1X,20F12.2)
C     THE FORGOING FORMAT DEPENDS ON INDIVIDUAL JOB SPECS.
      RETURN
      END
```

Appendix 3

```
      PROGRAM RELIAB
      DIMENSION B(100),VAR(100),IND(100),SUM(100),BV(100),BM(100,6)
      DOUBLE PRECISION A(100,100)
      INTEGER TOTCNT,BADCNT
      COMMON TOTCNT,BADCNT,DISGDBLN,DISBDBLN,DISCONST,PRINT
*** RETREIVE DATA FILES
      OPEN (1,FILE='LPT1')
      OPEN (2, FILE= 'RELBSTAT.TXT', STATUS= 'OLD')
      READ(2,*,ERR=901) MP,N,M,M1,PRINT,VARLIM,DISGDBLN,DISBDBLN,
    1 DISCONST
  901 CONTINUE
*     WRITE(1,*) MP,N,M,M1,PRINT,VARLIM,DISGDBLN,DISBDBLN,DISCONST
*     OPEN (5, FILE= 'BEAMSTAT.TXT', STATUS= 'OLD')
*     READ(5,*,ERR=902) NP,MP,N,M,M1,M2,M3
* 902 PRINT 100,NP,MP,N,M,M1,M2,M3
```

```
          PRINT *, 'MADE IT PAST BEAMSTAT'
      OPEN(4, FILE='RELBDAT.TXT', STATUS='OLD')
         DO 3 I=1,M+1
            DO 2 J=1,N+1
               READ(4,*,ERR=903)A(I,J)
   2        CONTINUE
   3     CONTINUE
 903     OPEN (7,FILE='BLEND.TXT',STATUS='OLD')
         DO 4 J=1,N
*            READ(7,250,ERR=904) B(J)
             READ(7,*,ERR=904) B(J)
   4     CONTINUE
 904     OPEN (8,FILE='PARAMMAX.TXT',STATUS='OLD')
           BM(1,1)=0
           BM(1,2)=0
           BM(1,3)=9999999.0
         DO 5 J=2,M+1
            READ(8,*,ERR=905) BM(J,1)
            BM(J,2)=0
            BM(J,3)=9999999.0
   5     CONTINUE
         WGTPRICE=0
         DO 7 J=1,N
           WGTPRICE=WGTPRICE+B(J)*A(1,J+1)
   7     CONTINUE
         BM(1,1)=VGTPRICE
*         VARLIM=2
*         DISGDBLN=1
 905     TOTCNT=0
         BADCNT=0
*         M=3
*** INITIALIZE VARIANCE VECTOR and KEEP INT PART OF OPTIMAL BLEND
         INDCNT=0
         DO 45 I=1,N
*           PRINT *,B(I)
            B(I)=NINT(B(I)*100)
*           PRINT *,B(I)
            IF (B(I).NE.0) THEN
               INDCNT=INDCNT+1
               IND(INDCNT)=I
               VAR(I)=-VARLIM
            ELSE
               VAR(I)=0
            ENDIF
*           PRINT *, 'I,INDCNT,B(I),VAR(I)'
*           PRINT *,I,INDCNT,B(I),VAR(I)
*           VAR(I)=-VARLIM
  45     CONTINUE
*        PRINT *,'INDCNT= ',INDCNT
*        PRINT *, 'J,IND(J),B(IND(J))'
         DO 46 J=1,INDCNT
*           PRINT *,J,IND(J),B(IND(J))
  46     CONTINUE
*** CALCULATE BLENDS and EVALUATE EACH BLEND
*        PRINT *,(VAR(JJ),JJ=1,N)
  49     JJ=1
         II = IND(JJ)
  50     IF (VAR(II).LT.VARLIM) THEN
            : VAR(II)=VAR(II)+1
            GO TO 90
         ELSE
            VAR(II)=-VARLIM
            JJ=JJ+1
            II=IND(JJ)
         ENDIF
         IF (JJ.LE.INDCNT) THEN
            GO TO 50
         ELSE
```

```
         GO TO 1000
      ENDIF
90    CONTINUE
       PRINT *,VAR(3),VAR(2),VAR(1)
       CALL BLNDEVAL(MP,N,M,M1,INDCNT,IND,A,B,VAR,BV,SUM,BM)
       GO TO 49
100   FORMAT (1X,12F10.2)
250   FORMAT(5X,F20.9)
300   FORMAT(I15)
350   FORMAT(5F19.9)
1000  FAILRATE=(BADCNT/TOTCNT)*100
      OPEN (9,FILE='BADCOUNT.TXT',STATUS='NEW')
      OPEN (10,FILE='FAILSTAT.TXT',STATUS='NEW')
      WRITE(9,300) TOTCNT
      WRITE(9,300) BADCNT
*      PRINT *,'TOTAL COUNT= ',TOTCNT
*      PRINT *,'TOTAL FAILURES= ',BADCNT
*      PRINT *,'FAILURE RATE= ',FAILRATE*100,' PERCENT'
*      PRINT *,'MAXIMUM MAXIMUM MINIMUM MEAN     CONSTRAINT'
*      PRINT *,'LIMIT   OVERALL OVERALL OVERALL  FAILURES'
      DO 1111 I=1,M+1
         BM(I,4)=BM(I,4)/TOTCNT
*         PRINT *,BM(I,1),BM(I,2),BM(I,3),BM(I,4),BM(I,5)
         WRITE(10,350) BM(I,1),BM(I,2),BM(I,3),BM(I,4),BM(I,5)
1111  CONTINUE
      STOP
      END
*********************************************************************
*                                                                   *
      SUBROUTINE CONSTRNT(MP,N,M,M1,A,B,SUM,VAR,BM,BV)
*                                                                   *
*********************************************************************
      DIMENSION B(MP),SUM(MP),VAR(MP),BM(MP,6),BV(MP)
      DOUBLE PRECISION A(MP,MP)
      INTEGER TOTCNT,BADCNT
      COMMON TOTCNT,BADCNT,DISGDBLN,DISBDBLN,DISCONST,PRINT
**      PRINT *, 'M1=', M1
**      PRINT *, 'JUST IN TO CONSTRNT'
**      PRINT *, 'M=',M,'N=',N
      DISPLAY=0
      BADCONST=0
      TOTCNT=TOTCNT+1
      DO 5 I=1,M+1
         SUM(I)=0
5     CONTINUE
      DO 20 I=1,M+1
         DO 10 J=2,N+1
            SUM(I) = SUM(I) + A(I,J)*(BV(J-1)/100)
**          PRINT *, 'A(I,J),BV(J-1)/100,SUM(I)'
***         PRINT *, A(I,J),BV(J-1)/100,SUM(I)
10       CONTINUE
         BM(I,4)=BM(I,4)+SUM(I)
**       PRINT *, 'SUM(I)?BM(I,1)'
**       PRINT *, SUM(I),BM(I,1)
         IF (I.NE.1) THEN
           IF (I.LE.M1+1) THEN
             IF (SUM(I).GT.BM(I,1)) THEN
                BADCONST=1
                DISPLAY=1
                IF (DISCONST.EQ.1) THEN
                  IF (PRINT .EQ.1) THEN
                    WRITE(1,*) SUM(I),'NOT .LE. ',BM(I,1)
                  ELSE
                    PRINT *, SUM(I),' NOT .LE. ',BM(I,1)
                  ENDIF
                ENDIF.
```

```
                  ENDIF
*                 IF (SUM(I) .GT. BM(I,2)) THEN
*                    BM(I,2)=SUM(I)
*                 ENDIF
*                 IF (SUM(I).LT.BM(I,3)) THEN
*                    BM(I,3)=SUM(I)
*                 ENDIF
              ELSE
                 IF (SUM(I) .LT. BM(I,1)) THEN
                   BADCONST=1
                   DISPLAY=1
                   IF (DISCONST.EQ.1)THEN
                     IF (PRINT .EQ. 1) THEN
                       WRITE(1,*) SUM(I)," NOT .GE. ",BM(I,1)
                     ELSE
                       PRINT *,SUM(I)," NOT .GE. ",BM(I,1)
                     ENDIF
                   ENDIF
                 ENDIF
*                IF (SUM(I).LT.BM(I,3)) THEN
*                   BM(I,3)=SUM(I)
*                ENDIF
*                IF (SUM(I).GT.BM(I,2)) THEN
*                   BM(I,2)=SUM(I)
*                ENDIF
              ENDIF
           ENDIF
              IF (SUM(I).LT.BM(I,3)) THEN
                 BM(I,3)=SUM(I)
              ENDIF
              IF (SUM(I).GT.BM(I,2)) THEN
                 BM(I,2)=SUM(I)
              ENDIF
*          ENDIF
           IF (badconst.EQ.1) THEN
              BM(I,5)=BM(I,5)+1
              BADCONST=0
           ENDIF
20      CONTINUE
        IF (DISPLAY .EQ. 1) THEN
           BADCNT = BADCNT+1
           IF(DISBDBLN.EQ.1)THEN
             IF (PRINT .EQ. 1) THEN
     WRITE(1,*) "THE ABOVE CONSTRAINTS FAILED THE FOLLOWING BLEND:"
     WRITE(1,*) "INITIAL      BLEND       RESULTANT"
     WRITE(1,*) " BLEND      VARIANCE      BLEND"
             ELSE
     PRINT *, "THE ABOVE CONSTRAINTS FAILED THE FOLLOWING BLEND:"
     PRINT *, "INITIAL      BLEND       RESULTANT"
     PRINT *, " BLEND      VARIANCE      BLEND"
             ENDIF
             DO 40 I=1,N
               IF (PRINT .EQ. 1) THEN
                 WRITE(1,100) B(I),VAR(I),BV(I)
               ELSE
                 PRINT 100, B(I),VAR(I),BV(I)
               ENDIF
40           CONTINUE
             IF (PRINT .EQ. 1) THEN
               WRITE(1,*) "*********************************"
             ELSE
               PRINT *, "*********************************"
             ENDIF
           ENDIF
        ELSE
           IF (DISGDBLN.EQ.1)THEN
             IF (PRINT .EQ. 1) THEN
               WRITE(1,*)"THE FOLLOWING BLEND MET ALL CONSTRAINTS:"
```

```
            WRITE(1,*)'INITIAL    BLEND     RESULTANT'
            WRITE(1,*)' BLEND    VARIANCE     BLEND'
         ELSE
            PRINT *,'THE FOLLOWING BLEND MET ALL CONSTRAINTS:'
            PRINT *, 'INITIAL    BLEND     RESULTANT'
            PRINT *, ' BLEND    VARIANCE     BLEND'
         ENDIF
             DO 50 I=1,N
                IF (PRINT .EQ. 1) THEN
                   WRITE(1,100)B(I),VAR(I),BV(I)
                ELSE
                   PRINT 100, B(I),VAR(I),BV(I)
                ENDIF
  50         CONTINUE
             IF (PRINT .EQ. 1) THEN
                WRITE(1,*) '**********************************'
             ELSE
                PRINT *, '**********************************'
             ENDIF
           ENDIF
         ENDIF
 100    FORMAT (1X,F6.2,6X,F6.2,9X,F6.2)
        RETURN
        END
***************************************************************
*                                                              *
      SUBROUTINE BLNDEVAL(MP,N,M,M1,INDCNT,IND,A,B,VAR,BV,SUM,BM)
*                                                              *
***************************************************************
        DIMENSION B(MP),VAR(MP),IND(MP),SUM(MP),BV(MP),BM(MP,6)
        DOUBLE PRECISION A(MP,MP)
        INTEGER TOTCNT,BADCNT
        COMMON TOTCNT,BADCNT,DISGDBLN,DISBDBLN,DISCONST,PRINT
        CHECKNEG=0
        CHECKHUN=0
***     PRINT *, 'IN BLNDEVAL BEFORE DO LOOP'
        DO 10 J=1,INDCNT
***     PRINT *, 'JUST IN DO LOOP'
***     PRINT *,J,I
           I=IND(J)
           BV(I)=B(I)+VAR(I)
           CHECKHUN=CHECKHUN+BV(I)
***     PRINT *,'J,I=IND(J),BV(I),B(I),VAR(I),CHECKHUN'
***     PRINT *, J,I,BV(I),B(I),VAR(I)
           IF (BV(I).LT.0) THEN
              CHECKNEG=1
           ELSE
           ENDIF
  10    CONTINUE
***     PRINT *, 'CHECKHUN = ',CHECKHUN
        IF ((CHECKNEG.EQ.1).OR.(CHECKHUN.NE.100))THEN
           IF (CHECKNEG.EQ.1) THEN
***           PRINT *, 'CHECKNEG IS NEGATIVE'
           ELSE
           ENDIF
           RETURN
        ELSE
***        PRINT *, 'BEFORE CALLING CONSTRNT'
***        PRINT *,BV(1),BV(2),BV(3)
***        PRINT *, 'THIS IS A GOOD BLEND'
           CALL CONSTRNT(MP,N,M,M1,A,B,SUM,VAR,BM,BV)
****        PRINT *, (BV(IND(JJ)),JJ=1,INDCNT)
****        PRINT *, (VAR(IND(JJ)),JJ=1,INDCNT)
        ENDIF
        RETURN
        END
```

APPENDIX 4

```
      PROGRAM SVDTST
      DOUBLE PRECISION A(350,30),U(350,30),W(350),V(30,30),EVAREGSS,
     1 B(350),X(350),WMAX,WMIN,RSQ,RI,TOL,CVM(30,30),RIJ(30,30),residue,
     2 SUM,AVG,YFIT(350),SMSQDF,TOTSS,REGSS,REGMS,REMSMAX,R2,CP,ovallf,
     3 RESSS,RESMS,XX(-5:350,30),DATA(350),AVE,ADEV,SDEV,VAR,SKEW,CURT,
     4 CONDNUM
*     CALL UNDER0(.TRUE.)
*     M=53
*     N=4
      CHARACTER TEXT1*70,TEXT2*70,TEXT3*70
      COMMON ISVDPRT
      MP=350
      NP=350
C Open data files for m,n,tolerance,A,b and read.
      OPEN(3,FILE='SVDSTORE.TXT',ACCESS='APPEND')
      OPEN(7,FILE='SVD123.PRN',STATUS='OLD')
      READ(7,*) M,N,TOL
      READ(7,*) IPMAX,REMSMAX
      READ(7,*) LSVDPRT
      READ(7,*) IENTVAR
      READ(7,*) EVAREGSS
      READ(7,'(A)') TEXT1
      READ(7,'(A)') TEXT2
      READ(7,'(A)') TEXT3
      WRITE(3,*) ' '
      WRITE(*,*) ' '
      WRITE(3,*) 'General Information'
      WRITE(*,*) 'General Information'
      WRITE(3,*) ' '
      WRITE(*,*) ' '
      WRITE(*,'(T2,A,T34,I4)')'No. of observations',M
      WRITE(*,'(T2,A,T34,I4)')'No. of ind. variables',N-1
      WRITE(*,'(T2,A,T34,I4)')'Response variable is no.',N
      WRITE(*,'(T2,A,T34,E10.2)')'SVD Tolerance',TOL
      WRITE(*,*) ' '
      WRITE(*,*) 'Comments:'
      WRITE(*,'(T2,A)') TEXT1
      WRITE(*,'(T2,A)') TEXT2
      WRITE(*,'(T2,A)') TEXT3
      WRITE(3,'(T2,A,T34,I4)')'No. of observations',M
      WRITE(3,'(T2,A,T34,I4)')'No. of ind. variables',N-1
      WRITE(3,'(T2,A,T34,I4)')'Response variable is no.',N
      WRITE(3,'(T2,A,T34,E10.2)')'SVD Tolerance',TOL
      WRITE(3,*) ' '
      WRITE(3,*) 'Comments:'
      WRITE(3,'(T2,A)') TEXT1
      WRITE(3,'(T2,A)') TEXT2
      WRITE(3,'(T2,A)') TEXT3
*     OPEN(7,FILE='SVDA.PRN',STATUS='OLD')
*     OPEN(8,FILE='SVDB.TXT',STATUS='OLD')
      DO 1 I=1,M
         READ (7,*,END=1) (A(I,J),J=1,N),B(I)
*        READ (8,*) B(I)
   1  CONTINUE
      PROGRAM SVDTST
      DOUBLE PRECISION A(350,30),U(350,30),W(350),V(30,30),EVAREGSS,
     1 B(350),X(350),WMAX,WMIN,RSQ,RI,TOL,CVM(30,30),RIJ(30,30),residue,
     2 SUM,AVG,YFIT(350),SMSQDF,TOTSS,REGSS,REGMS,REMSMAX,R2,CP,ovallf,
     3 RESSS,RESMS,XX(-5:350,30),DATA(350),AVE,ADEV,SDEV,VAR,SKEW,CURT,
     4 CONDNUM
*     CALL UNDER0(.TRUE.)
*     M=53
*     N=4
      CHARACTER TEXT1*70,TEXT2*70,TEXT3*70
      COMMON ISVDPRT
      MP=350
```

```
      NP=350
C Open data files for m,n,tolerance,A,b and read.
      OPEN(3,FILE='SVDSTORE.TXT',ACCESS='APPEND')
      OPEN(7,FILE='SVD123.PRN',STATUS='OLD')
      READ(7,*) M,N,TOL
      READ(7,*) IPMAX,REMSMAX
      READ(7,*) ISVDPRT
      READ(7,*) IENTVAR
      READ(7,*) EVAREGSS
      READ(7,'(A)') TEXT1
      READ(7,'(A)') TEXT2
      READ(7,'(A)') TEXT3
      WRITE(3,*) ' '
      WRITE(*,*) ' '
      WRITE(3,*) 'General Information'
      WRITE(*,*) 'General Information'
      WRITE(3,*) ' '
      WRITE(*,*) ' '
      WRITE(*,'(T2,A,T34,I4)')'No. of observations',M
      WRITE(*,'(T2,A,T34,I4)')'No. of ind. variables',N-1
      WRITE(*,'(T2,A,T34,I4)')'Response variable is no.',N
      WRITE(*,'(T2,A,T34,E10.2)')'SVD Tolerance',TOL
      WRITE(*,*) ' '
      WRITE(*,*) 'Comments:'
      WRITE(*,'(T2,A)') TEXT1
      WRITE(*,'(T2,A)') TEXT2
      WRITE(*,'(T2,A)') TEXT3
      WRITE(3,'(T2,A,T34,I4)')'No. of observations',M
      WRITE(3,'(T2,A,T34,I4)')'No. of ind. variables',N-1
      WRITE(3,'(T2,A,T34,I4)')'Response variable is no.',N
      WRITE(3,'(T2,A,T34,E10.2)')'SVD Tolerance',TOL
      WRITE(3,*) ' '
      WRITE(3,*) 'Comments:'
      WRITE(3,'(T2,A)') TEXT1
      WRITE(3,'(T2,A)') TEXT2
      WRITE(3,'(T2,A)') TEXT3
*     OPEN(7,FILE='SVDA.PRN',STATUS='OLD')
*     OPEN(8,FILE='SVDB.TXT',STATUS='OLD')
      DO 1 I=1,M
          READ (7,*,END=1) (A(I,J),J=1,N),B(I)
*         READ (8,*) B(I)
    1 CONTINUE
C Save the original A matrix in U and XX
      DO 2 I=1,M
        DO 2 J=1,N
          U(I,J)=A(I,J)
          IF (J.NE.N) THEN
            XX(I,J)=A(I,J+1)
          ELSE
            XX(I,J)=B(I)
          ENDIF
    2 CONTINUE
C    Calculate ave,sdev etc. of the Xi's
      DO 570 J=1,N
        DO 564 I=1,M
          DATA(I)=XX(I,J)
  564   CONTINUE
        CALL MOMENT(NP,DATA,M,AVE,ADEV,SDEV,VAR,SKEW,CURT)
        XX(0,J)=AVE
        XX(-1,J)=ADEV
        XX(-2,J)=SDEV
        XX(-3,J)=VAR
        XX(-4,J)=SKEW
        XX(-5,J)=CURT
  570 CONTINUE
C Calculate ave, sdev etc. of the Response(i)=B(i)
C     CALL MOMENT(NP,B,M,AVE,ADEV,SDEV,VAR,SKEW,CURT)
C Print Xi's,Yi's and their ave, sdev etc.
      WRITE(*,*) ' '
```

```fortran
      WRITE(*,'(1X,T24,A)') 'The Original and/or Transformed data'
      WRITE(*,*) ' '
      WRITE (*,'(T2,A,I9,18I12)')'OBS./VAR.',(J,J=1,N)
      WRITE(3,*) ' '
      WRITE(3,'(1X,T24,A)') 'The Original and/or Transformed data'
      WRITE(3,*) ' '
      WRITE (3,'(T2,A,I9,18I12)')'OBS./VAR.',(J,J=1,N)
      DO 600 I=1,M
         WRITE(*,611)I, (XX(I,J),J=1,N)
*carl    WRITE(3,611)I, (XX(I,J),J=1,N)
  600 CONTINUE
      WRITE(*,612) ' AVE:',(XX(0,J),J=1,N)
      WRITE(*,612) 'ADEV:',(XX(-1,J),J=1,N)
      WRITE(*,612) 'SDEV:',(XX(-2,J),J=1,N)
      WRITE(*,612) ' VAR:',(XX(-3,J),J=1,N)
      WRITE(*,612) 'SKEW:',(XX(-4,J),J=1,N)
      WRITE(*,612) 'CURT:',(XX(-5,J),J=1,N)
      WRITE(3,612) ' AVE:',(XX(0,J),J=1,N)
      WRITE(3,612) 'ADEV:',(XX(-1,J),J=1,N)
      WRITE(3,612) 'SDEV:',(XX(-2,J),J=1,N)
      WRITE(3,612) ' VAR:',(XX(-3,J),J=1,N)
      WRITE(3,612) 'SKEW:',(XX(-4,J),J=1,N)
      WRITE(3,612) 'CURT:',(XX(-5,J),J=1,N)
  611 FORMAT(1X,I5,1X,18F12.4)
  612 FORMAT(1X,A,1X,18F12.4)
C Calculate and print the Rij correlation matrix
      CALL SRIJ(M,N,XX,RIJ)
      WRITE(*,*) ' '
      WRITE(*,'(1X,T24,A)') 'The Correlation Matrix'
      WRITE(*,*) ' '
      WRITE (*,'(T2,A,I10,18I12)')'VARIABLE',(J,J=1,N)
      WRITE(3,*) ' '
      WRITE(3,'(1X,T24,A)') 'The Correlation Matrix'
      WRITE(3,*) ' '
      WRITE (3,'(T2,A,I10,18I12)')'VARIABLE',(J,J=1,N)
      DO 620 I=1,N
         WRITE(*,611) I,(Rij(i,j), j=1,N)
         WRITE(3,611) I,(Rij(i,j), j=1,N)
  620 CONTINUE
      WRITE(*,'(T2,A,I2,T25,A)')'NOTE: The variable #',n,
     1 'is the dependent Response.'
      WRITE(*,*) ' '
      WRITE(3,'(T2,A,I2,T25,A)')'NOTE: The variable #',n,
     1 'is the dependent Response.'
      WRITE(3,*) ' '
C Print the Ax=b; the design matrix, A and the vector b.
****  PRINT *, '    A(I,J)        B'
      DO 55 I=1,M
*        B(I)=4
****     WRITE (5,56) (A(I,J),J=1,N),B(I)
   55 CONTINUE
   56 FORMAT (1X,18F12.4)
C Decompose the A=U design matrix into singular value form.
      CALL SVDCMP(U,M,N,MP,NP,W,V)
C Print the resultant matrices and vectors of SVD.
      IF (ISVDPRT.EQ.1) THEN
      WRITE(*,*)'This is W, the diagonal of the Singular Value Matrix.'
******WRITE(3,*)'This is W, the diagonal of the Singular Value Matrix.'
      DO 3 J=1,N
*        WRITE (6,6) W(J)
         WRITE (6,9) W(J)
         WRITE (3,9) W(J)
    3 CONTINUE
      WRITE (6,7)
      WRITE(*,*)'This is mUn, the orthonormal basis matrix for the
     *range of A.'
      WRITE (3,7)
```

```
      WRITE(3,*)'This is aUn, the orthonormal basis matrix for the
     *range of A.'
      DO 4,I=1,M
         WRITE(6,9) (U(I,J), J=1,N)
         WRITE(3,9) (U(I,J), J=1,N)
    4 CONTINUE
      WRITE(6,7)
      WRITE(*,*)'This is V, the orthonormal basis matrix for the Null
     *space of A.'
      WRITE(3,7)
      WRITE(3,*)'This is V, the orthonormal basis matrix for the Null
     *space of A.'
      DO 5 I=1,N
         WRITE(6,9)(V(I,J),J=1,N)
         WRITE(3,9)(V(I,J),J=1,N)
    5 CONTINUE
      ENDIF
C Zero the singular values fall under tolerance levels.
      WRITE(*,*)' '
      WRITE(*,'(T2,A)')'Singular Values before tolerance check'
      WRITE(*,*)' '
      WRITE(*,'(T12,A)')'Singular'
      WRITE(*,'(T2,A,T14,A)')'Index','values'
      WRITE(3,*)' '
      WRITE(3,'(T2,A)')'Singular Values before tolerance check'
      WRITE(3,*) ' '
      WRITE(3,'(T12,A)')'Singular'
      WRITE(3,'(T2,A,T14,A)')'Index','values'
      WMAX = 0.0D0
      WMIN = 1.0D20
      itolchk=0
      DO 13 J=1,N
         WRITE(*,611) J, W(J)
         WRITE(3,611) J, W(J)
         IF (W(J).GT.WMAX) WMAX=W(J)
         IF (W(J).LT.WMIN) WMIN=W(J)
   13 CONTINUE
      CONDNUM=WMAX/WMIN
      WMIN=WMAX*TOL
      WRITE(*,*) ' '
      WRITE(3,*) ' '
      DO 14 J=1,N
         IF(W(J).LT.WMIN) THEN
            W(J)=0.0
            WRITE(*,'(T2,A,T42,I2,T45,F12.4)')
     1 'Index, Zeroed Singular value:',J,W(J)
            WRITE(3,'(T2,A,T42,I2,T45,F12.4)')
     1 'Index, Zeroed Singular value:',J,W(J)
            itolchk=1
         ENDIF
   14 CONTINUE
      IF (ITOLCHK.EQ.0) THEN
         WRITE(*,'(T2,A)')'NOTE: All Singular values > Tolerance.'
         WRITE(3,'(T2,A)')'NOTE: All Singular values > Tolerance.'
      ENDIF
*     WRITE(*,*) ' '
*     WRITE(3,*) ' '
      WRITE(*,'(T2,A,T28,F12.6)') 'Matrix Condition Number',CONDNUM
      WRITE(3,'(T2,A,T28,F12.6)') 'Matrix Condition Number',CONDNUM
      WRITE(*,*) ' '
      WRITE(3,*) ' '
C Solve for x in Ax=b using the Zeroed Singular Values.
      CALL SVBKSB(U,W,V,M,N,MP,NP,B,X)
C Calculate Yfit & Residual Sum of Squares
      RSQ=0.0
****     PRINT *, 'A*x               b'
      DO 90 I=1,M
         RI=0.0D0
```

```
         DO 80 J=1,N
           RI=RI+X(J)*A(I,J)
  80     CONTINUE
         YFIT(I)=RI
****         WRITE(6,9)YFIT(I),B(I)
         RSQ=RSQ+(YFIT(I)-B(I))**2
  *       PRINT *,RSQ
  90   CONTINUE
       RESIDUE=DSQRT(RSQ)
***      PRINT *,' '
***        PRINT *,'RESIDUE= ',RESIDUE

***        PRINT *,' '
C   Calculate mean of response vector:
***       CALL SSUM(B,M,NP,SUM)
***       CALL SAVG(M,SUM,AVG)
       AVG=XX(0,N)
  *     WRITE(6,181) AVG
  * 181 FORMAT(1X,'THE MEAN OF THE RESPONSE VALUES',5X,F14.8)
       WRITE(*,*)' '
       WRITE(*,*)' '
       WRITE(*,'(T24,A)')'Analysis of Variance Table (ANOVA)'
       WRITE(*,*)' '
       WRITE(6,199)
       WRITE(*,*) ' '
       WRITE(3,*)' '
       WRITE(3,*)' '
       WRITE(3,'(T24,A)')'Analysis of Variance Table (ANOVA)'
       WRITE(3,*)' '
       WRITE(3,199)
       WRITE(3,*) ' '
 199  FORMAT(1X,'Source',9X,'d. f.',8X,'Sums sqs.',9X,'Mean sq.',9X,
     1 'Overall F.')
  *    PRINT *,' '
C   Calculate total degrees of freedom:
       ITOTDF=M-1
C   Calculate Total SS = Sum((response(i)-av(tot response))**2)
       CALL SSMSQDFC(NP,M,B,AVG,SMSQDF)
       TOTSS=SMSQDF
       WRITE(6,201) ITOTDF,TOTSS
       WRITE(3,201) ITOTDF,TOTSS
C   Calculate Regression degrees of Freedom: = # of ind. var. - 1 for const. var.
       IREGDF=N-1
C   Calculate Reg. SS = Sum((Yfit(i)-av(tot response))**2)
       CALL SSMSQDFC(NP,M,YFIT,AVG,SMSQDF)
       REGSS=SMSQDF
C   Calculate Reg. Mean Square = Reg. SS/Reg. d. f.
       REGMS=REGSS/IREGDF
C   Calculate Residual degress of Freedom: = m-p-1
       IRESDF= ITOTDF-IREGDF
C   Calculate Residual SS= Sum((Yfit(i)-Response(i))**2), RSQ above
       RESSS=RSQ
C   Calculate Residual Mean Square = Resid. SS/ Resid. d. f.
       RESMS=RESSS/IRESDF
C   Calculate Overall F = Regression MS/Residual MS
       OVALLF=REGMS/RESMS
       WRITE(6,202)IREGDF,REGSS,REGMS,OVALLF
       WRITE(6,203) IRESDF,RESSS,RESMS
       WRITE(3,202)IREGDF,REGSS,REGMS,OVALLF
       WRITE(3,203) IRESDF,RESSS,RESMS
C   Calculate and print the Covariance matrix s*s*(x'x)- pg 517 Num R.
C     pg 83 in Draper & Smith
       WRITE(*,*) ' '
       WRITE(*,'(T24,A)')'The Covariance Matrix'
       WRITE(*,*) ' '
       WRITE(3,*) ' '
       WRITE(3,'(T24,A)')'The Covariance Matrix'
       WRITE(3,*)' '
       CALL SVDVAR(V,N,NP,W,CVM,N)
```

```
      DO 200 I=1,N
         WRITE(6,9) (CVM(I,J), J=1,N)
         WRITE(3,9) (CVM(I,J), J=1,N)
  200 CONTINUE
C   Calculate the Residual table.
      WRITE(*,*) ' '
      WRITE(*,'(T24,A)')'Residual Table'
      WRITE(*,*) ' '
      WRITE(*,218) 'Obs.','Observed','Predicted','Normal'
      WRITE(*,219) 'No.','Y','Y','Residual','Deviate'
      WRITE(3,*) ' '
      WRITE(3,'(T24,A)')'Residual Table'
      WRITE(3,*) ' '
      WRITE(3,218) 'Obs.','Observed','Predicted','Normal'
      WRITE(3,219) 'No.','Y','Y','Residual','Deviate'
  218 FORMAT(1X,T4,A,T18,A,T29,A,T56,A)
  219 FORMAT(1X,T5,A,T21,A,T33,A,T42,A,T55,A)
      CALL SYSTEM('ERASE SVDRESID.PRN')
      OPEN(9,FILE='SVDRESID.PRN',STATUS='NEW')
      DO 220 I=1,M
         Ri=B(i)-Yfit(i)
         WRITE(9,222)I,RI,YFIT(I),(XX(I,J),J=1,N-1)
         WRITE(*,222)I,B(I),YFIT(I),Ri,Ri/DSQRT(RESMS)
         WRITE(3,222)I,B(I),YFIT(I),Ri,Ri/DSQRT(RESMS)
  220 CONTINUE
  222 FORMAT(1X,I5,7X,18F12.4)
C   Calculate the B Coefficients and Significance Table
      WRITE(*,*) ' '
      WRITE(*,'(T24,A)')'B Coefficients and Significance Table'
      WRITE(*,*) ' '
      WRITE(*,228) 'Var.','Decoded B','Standard','Partial'
      WRITE(*,229) 'No.','Mean','Coeff.','Error','F-Test'
      WRITE(3,*) ' '
      WRITE(3,'(T24,A)')'B Coefficients and Significance Table'
      WRITE(3,*) ' '
      WRITE(3,228) 'Var.','Decoded B','Standard','Partial'
      WRITE(3,229) 'No.','Mean','Coeff.','Error','F-Test'
  228 FORMAT(1X,T4,A,T29,A,T42,A,T55,A)
  229 FORMAT(1X,T5,A,T17,A,T32,A,T45,A,T56,A)
      DO 230 I=1,N-1
      Ri=CVM(I+1,I+1)*RESMS
      WRITE(*,232)I,XX(0,I),X(I+1),DSQRT(Ri),X(I+1)**2/Ri
      WRITE(3,232)I,XX(0,I),X(I+1),DSQRT(Ri),X(I+1)**2/Ri
  230 CONTINUE
*     PRINT *, ' '
      WRITE(*,'(T2,A,T14,E15.6)')'Constant B0:', X(1)
      WRITE(*,*) ' '
      WRITE(3,'(T2,A,T14,E15.6)')'Constant B0:', X(1)
      WRITE(3,*) ' '
  232 FORMAT(1X,I5,2X,F12.4,2X,E15.6,2F12.4)
C   Calculate and print Summary information.
      WRITE(*,*) ' '
      WRITE(*,'(T2,A)')'Regression Summary Information'
      WRITE(*,*) ' '
      WRITE(3,*) ' '
      WRITE(3,'(T2,A)')'Regression Summary Information'
      WRITE(3,*) ' '
      R2=100*REGSS/TOTSS
      WRITE(*,'(T2,A,T38,F12.4)') 'Squared Mult. Correlation, R**2',R2
      WRITE(3,'(T2,A,T38,F12.4)') 'Squared Mult. Correlation, R**2',R2
      IF (IPMAX.EQ.99) THEN
         Cp=RESSS/RESMS-(M-2*N)
      ELSE
         Cp=RESSS/REMSMAX-(M-2*N)
      ENDIF
      WRITE(*,'(T2,A,T38,F12.4)') 'Mallows'' Cp Statistic',Cp
      WRITE(*,'(T2,A,T38,F12.4)') 'Std. Dev. of Resid. MSE',DSQRT(RESMS)
      WRITE(*,'(T2,A,T38,F12.4)') 'Mean of Response Y',XX(0,N)
```

```fortran
      WRITE(3,'(T2,A,T38,F12.4)') 'Mallows'' Cp Statistic',Cp
      WRITE(3,'(T2,A,T38,F12.4)') 'Std. Dev. of Resid. MSE',DSQRT(RESMS)
      WRITE(3,'(T2,A,T38,F12.4)') 'Mean of Response Y',XX(0,N)
      RI=DSQRT(RESMS)/XX(0,N)*100
      WRITE(*,'(T2,A,T38,F12.4)')'Std. Dev. as % of Mean',RI
      WRITE(*,'(T2,A,T38,F12.4)') 'Degree of Freedom',M-N
      WRITE(3,'(T2,A,T38,F12.4)')'Std. Dev. as % of Mean',RI
      WRITE(3,'(T2,A,T38,F12.4)') 'Degree of Freedom',M-N
      IF (IENTVAR.NE.999) THEN
         WRITE(*,'(T2,A,T43,I2)')'Variable Entering',IENTVAR
         WRITE(3,'(T2,A,T43,I2)')'Variable Entering',IENTVAR
         RI= (REGSS-EVAREGSS)/RESMS
         WRITE(*,'(T2,A,T38,F12.4)')'Sequential F-test',RI
         WRITE(3,'(T2,A,T38,F12.4)')'Sequential F-test',RI
      ENDIF
    6 FORMAT(3D23.16)
    7 FORMAT(1H )
    8 FORMAT (1X,F16.12)
    9 FORMAT (1X,18F12.6)
  201 FORMAT (1X,'Total',10X,I5,3X,F14.6)
  202 FORMAT (1X,'Regression',5X,I5,3X,F14.6,3X,F14.6,5X,F14.6)
  203 FORMAT (1X,'Residual',7X,I5,3X,F14.6,3X,F14.6)
      STOP
      END
***************************************************************
      SUBROUTINE SVDCMP(A,M,N,MP,NP,W,V)
C  Given a matrix A, with logical dimensions M by N and physical dimensions
C  MP by NP, this routine computes its singular value decomposition,
C  A=U*W*V'. The matrix U replaces A on output. The diagonal matrix of singular
C  values W is output is output as a vector W. The matrix V (not the transpose
C  of V) is output as V.  M must be greater or equal to N; if it is smaller,
C  then A should be filled up to square with zero rows.
*
***************************************************************
      PARAMETER (NMAX=30)
      DOUBLE PRECISION A(MP,30),W(NP),V(30,30),RV1(NMAX),ANORM,C,F,
     1 G,H,S,SCALE,X,Y,Z
      COMMON ISVDPRT
      IF(M.LT.N) PAUSE 'You must augment A with extra zero rows.'
*** Householder reduction to bidiagonal form. ****
      G=0.0
      SCALE=0.0
      ANORM=0.0
      DO 25 I=1,N
         L=I+1
         RV1(I)=SCALE*G
         G=0.0
         S=0.0
         SCALE=0.0
         IF (I.LE.M) THEN
            DO 11 K=I,M
               SCALE=SCALE+DABS(A(K,I))
11          CONTINUE
            IF (SCALE .NE. 0.0D0) THEN
               DO 12 K=I,M
                  A(K,I)=A(K,I)/SCALE
                  S=S+A(K,I)*A(K,I)
12             CONTINUE
               F=A(I,I)
               G=-SIGN(DSQRT(S),F)
               H=F*G-S
               A(I,I)=F-G
               IF (I.NE.N) THEN
                  DO 15 J=L,N
                     S=0.0
                     DO 13 K=I,M
                        S=S+A(K,I)*A(K,J)
```

```
13          CONTINUE
            F=S/H
            DO 14 K=I,M
              A(K,J)=A(K,J)+F*A(K,I)
14          CONTINUE
15        CONTINUE
         ENDIF
         DO 16 K=I,M
           A(K,I)=SCALE*A(K,I)
16       CONTINUE
       ENDIF
      ENDIF
      V(I)=SCALE*G
      G=0.0
      S=0.0
      SCALE=0.0
      IF ((I.LE.M).AND.(I.NE.N)) THEN
        DO 17 K=L,N
          SCALE=SCALE+DABS(A(I,K))
17      CONTINUE
        IF (SCALE.NE.0.0D0) THEN
          DO 18 K=L,N
            A(I,K)=A(I,K)/SCALE
            S=S+A(I,K)*A(I,K)
18        CONTINUE
          F=A(I,L)
          G=-DSIGN(DSQRT(S),F)
          H=F*G-S
          A(I,L)=F-G
          DO 19 K=L,N
            RV1(K)=A(I,K)/H
19        CONTINUE
          IF (I.NE.M) THEN
            DO 23 J=L,M
              S=0.0
              DO 21 K=L,N
                S=S+A(J,K)*A(I,K)
21            CONTINUE
              DO 22 K=L,N
                A(J,K)=A(J,K)+S*RV1(K)
22            CONTINUE
23          CONTINUE
          ENDIF
          DO 24 K=L,N
            A(I,K)=SCALE*A(I,K)
24        CONTINUE
        ENDIF
      ENDIF
      ANORM=DMAX1(ANORM,(DABS(V(I))+DABS(RV1(I))))
25    CONTINUE
C     *** Accumulation of right-hand transformations.
      DO 32 I=N,1,-1
        IF (I.LT.N) THEN
          IF (G.NE.0.0D0) THEN
            DO 26 J=L,N
              V(J,I)=(A(I,J)/A(I,L))/G
26          CONTINUE
            DO 29 J=L,N
              S=0.0
              DO 27 K=L,N
                S=S+A(I,K)*V(K,J)
27            CONTINUE
              DO 28 K=L,N
                V(K,J)=V(K,J)+S*V(K,I)
28            CONTINUE
29          CONTINUE
          ENDIF
          DO 31 J=L,N
```

```
                V(I,J)=0.0
                V(J,I)=0.0
 31         CONTINUE
          ENDIF
          V(I,I)=1.0
          G=RV1(I)
          L=I
 32    CONTINUE
C     *** Accumulation of left-hand transformations.
       DO 39 I=N,1,-1
         L=I+1
         G=W(I)
         IF (I.LT.N) THEN
           DO 33 J=L,N
             A(I,J)=0.0
 33        CONTINUE
         ENDIF
         IF (G.NE.0.0D0) THEN
           G=1.0/G
           IF (I.NE.N) THEN
             DO 36 J=L,N
               S=0.0
               DO 34 K=L,M
                 S=S+A(K,I)*A(K,J)
 34            CONTINUE
               F=(S/A(I,I))*G
               DO 35 K=I,M
                 A(K,J)=A(K,J)+F*A(K,I)
 35            CONTINUE
 36          CONTINUE
           ENDIF
           DO 37 J=I,M
             A(J,I)=A(J,I)*G
 37        CONTINUE
         ELSE
           DO 38 J=I,M
             A(J,I)=0.0
 38        CONTINUE
         ENDIF
         A(I,I)=A(I,I)+1.0D0
 39    CONTINUE
C     *** Diagonalization of the bidiagonal form.
       IF (ISVDPRT.EQ.1) THEN
         PRINT *, 'THIS IS THE CONVERGENCE OF W(j)'
       ENDIF
       DO 49 K=N,1,-1
         DO 48,ITS=1,30
           IF (ISVDPRT.EQ.1) THEN
             PRINT *, W(1),W(2),W(3)
           ENDIF
           DO 41 L=K,1,-1
           NM=L-1
           IF ((DABS(RV1(L))+ANORM).EQ.ANORM) GO TO 2
           IF ((DABS(W(NM))+ANORM).EQ.ANORM) GO TO 1
 41        CONTINUE
 1         C=0.0
           S=1.0
           DO 43 I=L,K
             F=S*RV1(I)
             IF ((DABS(F)+ANORM).NE.ANORM) THEN
               G=W(I)
               H=DSQRT(F*F+G*G)
               W(I)=H
               H=1.0/H
               C=(G*H)
               S=-(F*H)
               DO 42 J=1,M
                 Y=A(J,NM)
```

```
                    Z=A(J,I)
                    A(J,NM)=(Y*C)+(Z*S)
                    A(J,I)=-(Y*S)+(Z*C)
42          CONTINUE
         ENDIF
43    CONTINUE
2     Z=W(K)
      IF (L.EQ.K) THEN
         IF (Z.LT.0.0D0) THEN
            W(K)=-Z
            DO 44 J=1,N
               V(J,K)=-V(J,K)
44          CONTINUE
         ENDIF
         GO TO 3
      ENDIF
      IF (ITS.EQ.30) PAUSE ' No convergence in 30 iterations'
      X=W(L)
      NM=K-1
      Y=W(NM)
      G=RV1(NM)
      H=RV1(K)
      F=((Y-Z)*(Y+Z)+(G-H)*(G+H))/(2.0D0*H*Y)
      G=DSQRT(F*F+1.0)
      F=((X-Z)*(X+Z)+H*((Y/(F+DSIGN(G,F)))-H))/X
C     ** Next QR transformation
      C=1.0
      S=1.0
      DO 47 J=L,NM
         I=J+1
         G=RV1(I)
         Y=W(I)
         H=S*G
         G=C*G
         Z=DSQRT(F*F+H*H)
         RV1(J)=Z
         C=F/Z
         S=H/Z
         F=(X*C)+(G*S)
         G=-(X*S)+(G*C)
         H=Y*S
         Y=Y*C
         DO 45 NM=1,N
            X=V(NM,J)
            Z=V(NM,I)
            V(NM,J)= (X*C)+(Z*S)
            V(NM,I)=-(X*S)+(Z*C)
45       CONTINUE
         Z=DSQRT(F*F+H*H)
         W(J)=Z
         IF (Z.NE.0.0D0) THEN
            Z=1.0/Z
            C=F*Z
            S=H*Z
         ENDIF
         F= (C*G)+(S*Y)
         X=-(S*G)+(C*Y)
         DO 46 NM=1,M
            Y=A(NM,J)
            Z=A(NM,I)
            A(NM,J)= (Y*C)+(Z*S)
            A(NM,I)=-(Y*S)+(Z*C)
46       CONTINUE
47    CONTINUE
         RV1(L)=0.0
         RV1(K)=F
         W(K)=X
48    CONTINUE
3     CONTINUE
```

```
   49 CONTINUE
      RETURN
      END
***********************************************************************
*                                                                     *
      SUBROUTINE SVBKSB(U,W,V,M,N,MP,NP,B,X)
C     Solves A*X=B for a vector X, where A is specified by the arrays
C     U, W, V as returned by SVDCMP. M and N are the logical dimensions
C     of A, and will be equal for square matrices. MP and NP are the
C     physical dimensions of A. B is the inpput right-hand side. X is
C     output solution vector. No input quantities are destroyed, so the
C     routine may be called sequentially with differeent B's.
*                                                                     *
***********************************************************************
      PARAMETER (NMAX=30)
      DOUBLE PRECISION U(MP,30),W(NP),V(30,30),B(MP),X(NP),TMP(NMAX),S
      COMMON ISVDPRT
      IF (ISVDPRT.EQ.1) THEN
       PRINT *, 'd=Ut*b'
      ENDIF
      DO 12 J=1,N
         S=0.0
         IF(W(J).NE.0.0D0) THEN
            DO 11 I=1,M
               S=S+U(I,J)*B(I)
   11       CONTINUE
            IF (ISVDPRT.EQ.1) THEN
              WRITE(6,15)S
            ENDIF
            S=S/W(J)
         ELSE
           DO 113 I=1,M
               S=S+U(I,J)*B(I)
  113       CONTINUE
            IF (ISVDPRT.EQ.1) THEN
              WRITE(6,15)S
            ENDIF
C********NOW SET S TO Z WHICH IS ZERO FOR THIS CASE.
            S=0.0
         ENDIF
         TMP(J)=S
   12 CONTINUE
      IF (ISVDPRT.EQ.1) THEN
         PRINT *, 'z(j)=d(j)/sigma(j)'
      DO 55 J=1,N
         WRITE(6,15)TMP(J)
   55 CONTINUE
      PRINT *, 'x=V*z'
      ENDIF
      DO 14 J=1,N
         S=0.0
         DO 13 JJ=1,N
            S=S+V(J,JJ)*TMP(JJ)
   13    CONTINUE
           PRINT *,S
         IF (ISVDPRT.EQ.1) THEN
           WRITE (6,15) S
         ENDIF
         X(J)=S
   14 CONTINUE
   15 FORMAT (1X,6F12.3)
      RETURN
      END
***********************************************************************
*                                                                     *
      SUBROUTINE SVDVAR(V,MA,NP,W,CVM,NCVM)
*                                                                     *
***********************************************************************
```

```
**    To evalute the covariance matrix CVM of the fit for MA parameters
**    obtained by SVDFIT, call this routine with matrices V,W as returned
**    from SVDFIT. NP,NCVM give the physical dimensions of V,W,CVM as
**    indicated below.
      PARAMETER(MMAX=30)
      DOUBLE PRECISION V(30,30),W(NP),CVM(30,30),WTI(30),TEMP,SUM
      DO 11 I=1,MA
        WTI(I)=0.0D0
          IF(W(I).NE.0.0D0)  WTI(I)=1./(W(I)*W(I))
   11 CONTINUE
        DO 14 I=1,MA
          DO 13 J=1,I
            SUM=0.0D0
            DO 12 K=1,MA
              TEMP=V(I,K)*V(J,K)*WTI(K)
*             print *,i,j,k,v(i,k),v(j,k),wti(k)
              SUM=SUM+TEMP
*             print *,i,j,k,sum
   12       CONTINUE
            CVM(I,J)=SUM
            CVM(J,I)=SUM
   13     CONTINUE
   14   CONTINUE
        RETURN
        END
***************************************************************
*                                                              *
      SUBROUTINE SSUM(X,N,NP,SUM)
*                                                              *
***************************************************************
      DOUBLE PRECISION X(NP),SUM
      SUM=0.0
      DO 10 I=1,N
        SUM=SUM+X(I)
   10 CONTINUE
      RETURN
      END
***************************************************************
*                                                              *
      SUBROUTINE SAVG(N,SUM,AVG)
*                                                              *
***************************************************************
      DOUBLE PRECISION AVG,SUM
      AVG=SUM/N
      RETURN
      END
***************************************************************
*                                                              *
      SUBROUTINE SSMSQDFC(NP,N,A,B,SMSQDF)
*                                                              *
***************************************************************
      DOUBLE PRECISION A(NP),B,SMSQDF,SUM
      SUM=0.0
      DO 10 I=1,N
        SUM=SUM+(A(I)-B)**2
   10 CONTINUE
      SMSQDF=SUM
      RETURN
      END
***************************************************************
*                                                              *
      SUBROUTINE SSMSQDF(NP,N,A,B,SMSQDF)
*                                                              *
***************************************************************
      DOUBLE PRECISION A(NP),B(NP),SMSQDF,SUM
      SUM=0.0
      DO 10 I=1,N
        SUM=SUM+(A(I)-B(I))**2
```

```
   10 CONTINUE
      SMSQDF=SUM
      RETURN
      END
***********************************************************************
*                                                                     *
      SUBROUTINE MOMENT(NP,DATA,N,AVE,ADEV,SDEV,VAR,SKEW,CURT)
*                                                                     *
***********************************************************************
      DOUBLE PRECISION DATA(NP),AVE,ADEV,SDEV,VAR,SKEW,CURT,P,S
      IF(N.LE.1) PAUSE 'N must be at least 2'
      S=0.0D0
      DO 11 J=1,N
         S=S+DATA(J)
   11 CONTINUE
      AVE=S/N
      ADEV=0.0D0
      VAR=0.0D0
      SKEW=0.0D0
      CURT=0.0D0
      DO 12 J=1,N
         S=DATA(J)-AVE
         ADEV=ADEV+DABS(S)
         P=S*S
         VAR=VAR+P
         P=P*S
         SKEW=SKEW+P
         P=P*S
         CURT=CURT+P
   12 CONTINUE
      ADEV=ADEV/N
      VAR=VAR/(N-1)
      SDEV=DSQRT(VAR)
      IF(VAR.NE.0.0D0) THEN
         SKEW=SKEW/(N*SDEV**3)
         CURT=CURT/(N*VAR**2)-3.0D0
      ELSE
         PAUSE 'No skew or kurtosis when zero variance'
      ENDIF
      RETURN
      END
***********************************************************************
*                                                                     *
      SUBROUTINE SRIJ(M,N,XX,RIJ)
*                                                                     *
***********************************************************************
      DOUBLE PRECISION RIJ(30,30),XX(-5:350,30),RNUM,SII,SJJ
      DO 300 I=1,N
         DO 200 J=1,N
         RNUM=0.0D0
         DO 100 IU=1,M
            RNUM=RNUM+(XX(IU,I)-XX(0,I))*(XX(IU,J)-XX(0,J))
  100    CONTINUE
         Sii=0.0D0
         Sjj=0.0D0
         DO 140 ID=1,M
            Sjj=Sjj+(XX(ID,J)-XX(0,J))**2
            Sii=Sii+(XX(ID,I)-XX(0,I))**2
  140    CONTINUE
         RIJ(I,J)=RNUM/DSQRT(Sjj*Sii)
  200    CONTINUE
  300 CONTINUE
      RETURN
      END
:Z
```

What is claimed:

1. A method for regulating the blending of a plurality of initial batches of a natural resource to obtain a plurality of optimized blended batches of said natural resource, said method comprising the steps of:
   (1) determining a characteristic of each of said plurality of initial batches of natural resource;
   (2) inputting said characteristic of each of said plurality of initial batches through an input means into a computer having a memory;
   (3) inputting a constraining characteristic of each of said plurality of optimized blended batches through said input means into said computer having a memory;
   (4) inputting a time period characteristic of multiple blending time periods through said input means into said computer having a memory;
   (5) inputting objective parameter to be optimized through said input means into said computer having a memory;
   (6) formatting (a) said characteristic of each of said plurality of initial batches, (b) said constraining characteristic of each of said plurality of optimized blended batches and (c) said time period characteristic of said multiple blending time periods, through a formatting means into a stored format of characteristics in the computer memory;
   (7) computer processing said stored format of characteristics through optimization means to achieve optimized blending ratios for blending said plurality of initial batches into each optimized blended batch, said blending ratios being optimized with respect to (a) said objective parameter, (b) said characteristic of each of said plurality of initial batches, (c) said constraining characteristic of each of said plurality of optimized blended batches and (d) said time period characteristic of said multiple blending time periods;
   (8) blending the plurality of initial batches of natural resources according to the optimized blending ratios to obtain optimized blended batches.

2. The method of claim 1 wherein said constraining characteristic of each of said plurality of optimized blended batches of step (3) of said method includes a constraining characteristic of multiple contracts for said plurality of optimized blended batches.

3. The method of claim 2 wherein said constraining characteristic of each of said plurality of optimized blended batches of step (3) of said method includes a constraining characteristic of multiple processing plants for the blending of the resource.

4. The method of claim 3 wherein step (7) further includes the determination of a stability factor for the optimized blending ratios and step (8) further includes blending the plurality of initial batches of natural resources according to the optimized blending ratios provided that the stability factor of said optimized blending ratios does not exceed a stability parameter threshold.

5. The method of claim 3 wherein step (7) further includes a stochastic back calculation of a characteristic of a batch of natural resources multiplied times a percent recovery of the optimized blended batch of natural resource.

6. The method of claim 5 wherein said stochastic back calculation includes singular value decomposition processing.

7. The method of claim 3 wherein said constraining characteristic of each of said plurality of optimized blended batches of step (3) of said method includes blending ratio limits.

8. The method of claim 3 further comprising the step of:
   (9) determining a time period characteristic based upon an optimized blending ratio.

9. The method of claim 1 wherein said stored format of characteristics in the computer memory includes a primary database and a secondary database.

10. The method of claim 9 wherein said primary and secondary databases are organized in a pyramid structure.

11. The method of claim 1 wherein step (7) further includes a stochastic back calculation of a characteristic of a batch of natural resources multiplied times a percent recovery of the optimized blended batch of natural resource.

12. The method of claim 11 wherein said stochastic back calculation includes singular value decomposition processing.

13. The method of claim 1 wherein step (7) further includes the determination of a stability factor for the optimized blending ratios and step (8) further includes blending the plurality of initial batches of natural resources according to the optimized blending ratios provided that the stability factor of said optimized blending ratios does not exceed a stability parameter threshold.

14. The method of claim 1 wherein said constraining characteristic of each of said plurality of optimized blended batches of step (3) of said method includes a constraining characteristic of a premium threshold.

15. The method of claim 1 wherein said constraining characteristic of each of said plurality of optimized blended batches of step (3) of said method includes a constraining characteristic of a penalty threshold.

16. The method of claim 1 wherein said input means includes add means for adding data to the computer memory.

17. The method of claim 1 wherein said input means includes delete means for deleting data from the computer memory.

18. The method of claim 1 wherein said input means includes modify means for changing data in the computer memory.

19. The method of claim 1 wherein said input means includes data input repeat means for duplicating input data.

20. The method of claim 1 wherein said input means includes user prompting means for prompting the user with messages to assist the user in inputting data into said computer memory.

21. The method of claim 1 wherein said constraining characteristic of each of said plurality of optimized blended batches of step (3) of said method includes blending ratio limits.

22. The method of claim 1 further comprising the step of:
   (9) determining a time period characteristic based upon an optimized blending ratio.

23. A method for regulating the blending of a plurality of initial batches of a natural resource to obtain a plurality of optimized blended batches of said natural resource, said method comprising the steps of:
   (1) determining a characteristic of each of said plurality of initial batches of natural resource;
   (2) inputting said characteristic of each of said plurality of initial batches through an input means into a computer having a memory;

(3) inputting a constraining characteristic of each of said plurality of optimized blended batches where said constraining characteristic include a constraining characteristic of multiple contracts for said plurality of optimized blended batches, through said input means into said computer having a memory;

(4) inputting a time period characteristic of a blending time period through said input means into said computer having a memory;

(5) inputting objective parameter to be optimized through said input means into said computer having a memory;

(6) formatting said characteristic of each of said plurality of initial batches, (b) said constraining characteristic of each of said plurality of optimized blended batches and (c) a time period characteristic of said blending time period, through a formatting means into a stored format of characteristics in the computer memory;

(7) computer processing said stored format of characteristics through optimization means to achieve optimized blending ratios for blending said plurality of initial batches into each optimized blended batch, said blending ratios being optimized with respect to (a) said objective parameter, (b) said characteristic of each of said plurality of initial batches, (c) said constraining characteristic of each of said plurality of optimized blended batches and (d) said time period characteristic of said blending time period;

(8) blending the plurality of initial batches of natural resources according to the optimized blending ratios to obtain optimized blended batches.

24. The method of claim 23 wherein said constraining characteristic of each of said plurality of optimized blended batches of step (3) of said method includes a constraining characteristic of a penalty threshold.

25. The method of claim 23 wherein said constraining characteristic of each of said plurality of optimized blended batches of step (3) of said method includes a constraining characteristics of multiple processing plants for the blending of the resource.

26. The method of claim 25 wherein step (7) further includes a stochastic back calculation of a characteristic of a batch of natural resources multiplied times a percent recovery of the optimized blended batch of natural resource.

27. The method of claim 26 wherein said stochastic back calculation includes singular value decomposition processing.

28. The method of claim 25 wherein said constraining characteristic of each of said plurality of optimized blended batches of step (3) of said method includes blending ratio limits.

29. The method of claim 25 further comprising the step of:
(9) determining a time period characteristic based upon an optimized blending ratio.

30. The method of claim 23 wherein step (7) further includes the determination of a stability factor for the optimized blending ratios and step (8) further includes blending the plurality of initial batches of natural resources according to the optimized blending ratios provided that the stability factor of said optimized blending ratios does not exceed a stability parameter threshold.

31. The method of claim 23 wherein said constraining characteristic of each of said plurality of optimized blended batches of step (3) of said method includes blending ratio limits.

32. The method of claim 23 further comprising the step of:
(9) determining a time period characteristic based upon an optimized blending ratio.

33. The method of claim 23 wherein said constraining characteristic of each of said plurality of optimized blended batches of step (3) of said method includes a constraining characteristic of a premium threshold.

34. The method of claim 23 wherein said input means includes add means of adding data to the computer memory.

35. The method of claim 23 wherein said input means includes delete means for deleting data from the computer memory.

36. The method of claim 23 wherein said input means includes modify means for changing data in the computer memory.

37. The method of claim 23 wherein said input means includes data input repeat means for duplicating input data.

38. The method of claim 23 wherein said stored format of characteristics in the computer memory includes a primary database and a secondary database.

39. The method of claim 38 wherein said primary and secondary databases are organized in a pyramid structure.

40. The method of claim 23 wherein said input means includes user prompting means for prompting the user with messages to assist the user in inputting data into said computer memory.

41. The method of claim 23 wherein step (7) further includes a stochastic back calculation of a characteristic of a batch of natural resources multiplied times a percent recovery of the optimized blended batch of natural resource.

42. The method of claim 41 wherein said stochastic back calculation includes singular value decomposition processing.

43. A method for regulating the blending of a plurality of initial batches of a natural resource to obtain a plurality of optimized blended batches of said natural resource, said method comprising the steps of:

(1) determining a characteristic of each of said plurality of initial batches of natural resource;

(2) inputting said characteristic of each of said plurality of initial batches through an input means into a computer having a memory;

(3) inputting a constraining characteristic of each of said plurality of optimized blended of the resource, through said input means into said computer having a memory;

(4) inputting a time period characteristic of a blending time period through said input means into said computer having a memory;

(5) inputting objective parameter to be optimized through said input means into said computer having a memory;

(6) formatting (a) said characteristic of each of said plurality of initial batches, (b) said constraining characteristic of each of said plurality of optimized blended batches and (c) said time period characteristic of said blending time period, through a formatting means into a stored format of characteristics in the computer memory;

(7) computer processing said stored format of characteristics through optimization means to achieve optimized blending ratios for blending said plurality of initial batches into each optimized blended batch, said blending ratios being optimized with respect to (a) said objective parameter, (b) said characteristic of each of said plurality of initial batches, (c) said constraining characteristic of each of said plurality of optimized blended batches and (d) said time period characteristic of said blending time period;

(8) blending the plurality of initial batches of natural resources according to the optimized blending ratios to obtain optimized blended batches.

44. The method of claim 43 wherein step (7) further includes a stochastic back calculation of a characteristic of a batch of natural resources multiplied times a percent recovery of the optimized blended batch or natural resource.

45. The method of claim 44 wherein said stochastic back calculation includes singular value decomposition processing.

46. The method of claim 43 wherein said stored format of characteristics in the computer memory includes a primary database and a secondary database.

47. The method of claim 46 wherein said primary and secondary databases are organized in a pyramid structure.

48. The method of claim 43 wherein said input means includes user prompting means for prompting the user with messages to assist the user in inputting data into said computer memory.

49. The method of claim 13 wherein said constraining characteristic of each of said plurality of optimized blended batches of step (3) of said method includes blending ratio limits.

50. The method of claim 49 further comprising the step of:
(9) determining a time period characteristic based upon an optimized blending ratio.

51. The method of claim 43 wherein step (7) further includes the determination of a stability factor for the optimized blending ratios and step (8) further includes blending the plurality of initial batches of natural resources according to the optimized blending ratios provided that the stability factor of said optimized blending ratios does not exceed a stability parameter threshold.

52. The method of claim 43 wherein said constraining characteristic of each of said plurality of optimized blended batches of step (3) of said method includes a constraining characteristic of a premium threshold.

53. The method of claim 43 wherein said constraining characteristic of each of said plurality of optimized blended batches of step (3) of said method includes a constraining characteristic of a penalty threshold.

54. The method of claim 43 wherein said input means includes add means of adding data to the computer memory.

55. The method of claim 43 wherein said input means includes delete means for deleting data from the computer memory.

56. The method of claim 43 wherein said input means includes modify means for changing data in the computer memory.

57. The method of claim 43 wherein said input means includes data input repeat means for duplicating input data.

58. A method for regulating the blending of a plurality of initial batches of a natural resource to obtain a plurality of optimized blended batches of said natural resource, said method comprising the steps of:

(1) determining a characteristic of each of said plurality of initial batches of natural resource;
(2) inputting said characteristic of each of said plurality of initial batches through an input means into a computer having a memory;
(3) inputting a constraining characteristic of each of said plurality of optimized blended batches where aid constraining characteristic include a constraining characteristic of a process for blending the resource, through said input means into said computer having a memory;
(4) inputting a time period characteristics of a blending time period through said input means into said computer having a memory;
(5) inputting objective parameter to be optimized through said input means into said computer having a memory;
(6) formatting (a) said characteristic of each of said plurality of initial batches, (b) said constraining characteristic of each of said plurality of optimized blended batches and (c) said time period characteristic of said blending time period, through a formatting means into a stored format of characteristics in the computer memory;
(7) computer processing said stored format of characteristics through optimization means to achieve optimized blending ratios for blending said plurality of initial batches into each optimized blended batch, said blending ratios being optimized with respect to (a) said objective parameter, (b) said characteristic of each of said plurality of initial batches, (c) said constraining characteristic of each of said plurality of optimized blended batches and (d) said time period characteristic of said blending time period and determining a stability factor for the optimized blending ratios;
(8) blending the plurality of initial batches of natural resources according to the optimized blending ratios to obtain optimized blended batches provided that the stability factor of said optimized blending ratios does not exceed a stability parameter threshold.

59. A method for regulating the blending of a plurality of initial batches of a natural resource to obtain a plurality of optimized blended batches of said natural resource, said method comprising the steps of:
(1) determining a characteristic of each of said plurality of initial batches of natural resource;
(2) inputting said characteristic of each of said plurality of initial batches through an input means into a computer having a memory;
(3) inputting a constraining characteristic of each of said plurality of optimized blended batches where said constraining characteristic include a constraining characteristic of a process for blending the resource, through said input means into said computer having a memory;
(4) inputting a time period characteristic of a blending time period through said input means into said computer having a memory;
(5) inputting objective parameter to be optimized through said input means into said computer having a memory;
(6) formatting (a) said characteristic of each of said plurality of initial batches, (b) said constraining characteristic of each of said plurality of optimized blended batches and (c) said time period characteristic of said blending time period, through a formatting means into a stored format of characteristics in the computer memory;

(7) computer processing said stored format of characteristics through optimization means to achieve optimized blending ratios for blending said plurality of initial batches into each optimized blended batch, said blending ratios being optimized with respect to (a) said objective parameter, (b) said characteristic of each of said plurality of initial batches, (c) said constraining characteristic of each of said plurality of optimized blended batches and (d) said time period characteristic of said blending timer period and processing a stochastic back calculation of a characteristic of a batch of natural resources multiplied times a percent recovery of the optimized blended batch of natural resource;

(8) blending the plurality of initial batches of natural resources according to the optimized blending ratios to obtain optimized blended batches.

60. The method of claim 59 wherein said stochastic back calculation includes singular value decomposition processing.

* * * * *